United States Patent
Suddaby

(10) Patent No.: US 10,788,011 B2
(45) Date of Patent: Sep. 29, 2020

(54) WAVE ENERGY CAPTURE DEVICE AND ENERGY STORAGE SYSTEM UTILIZING A VARIABLE MASS, VARIABLE RADIUS CONCENTRIC RING FLYWHEEL

(71) Applicant: Loubert S. Suddaby, Orchard Park, NY (US)

(72) Inventor: Loubert S. Suddaby, Orchard Park, NY (US)

(*) Notice: Subject to any disclaimer, the term of this patent is extended or adjusted under 35 U.S.C. 154(b) by 41 days.

(21) Appl. No.: 16/180,421

(22) Filed: Nov. 5, 2018

(65) Prior Publication Data

US 2020/0132040 A1    Apr. 30, 2020

Related U.S. Application Data

(63) Continuation of application No. 16/176,094, filed on Oct. 31, 2018.

(51) Int. Cl.
| | | |
|---|---|---|
| *F03B 13/18* | (2006.01) | |
| *F03B 13/10* | (2006.01) | |
| *F03B 13/22* | (2006.01) | |

(52) U.S. Cl.
CPC .......... *F03B 13/1895* (2013.01); *F03B 13/10* (2013.01); *F03B 13/22* (2013.01); *F05B 2210/11* (2013.01); *F05B 2260/421* (2013.01); *F05B 2260/502* (2013.01)

(58) Field of Classification Search
CPC ........ F03B 13/26; F03B 13/16; F03B 13/188; F03B 13/1885; F03B 13/20; F03B 15/00; F05B 2240/93; F05B 2260/4031; F05B 2220/706; F05B 2240/97; F05B 2280/5001

See application file for complete search history.

(56) References Cited

U.S. PATENT DOCUMENTS

| | | | |
|---|---|---|---|
| 1,008,682 A | 11/1911 | Wall | |
| 1,455,718 A | 5/1923 | Delong | |
| 1,930,958 A | 10/1933 | Parsons | |
| 3,335,667 A * | 8/1967 | Murphy | ................ F03B 13/188 417/246 |

(Continued)

FOREIGN PATENT DOCUMENTS

| | | |
|---|---|---|
| AU | 2015202311 | 5/2019 |
| CA | 2729927 | 1/2010 |

(Continued)

*Primary Examiner* — Shafiq Mian
(74) *Attorney, Agent, or Firm* — Simpson & Simpson, PLLC; Michael Nicholas Vranjes

(57) ABSTRACT

A wave energy capture device, including a wave chamber arranged to engage a body of water including a plurality of waves, including a floor having a front end and a rear end, a first opening arranged proximate the front end, a second opening arranged proximate the rear end, and a hose arranged on said floor and extending from the first opening to the second opening, the hose operatively arranged to fill with water from the body of water, and a cylinder arranged on the floor proximate the front end, the cylinder connected to the wave chamber via one or more springs, wherein, when one of the plurality of waves enters the first opening, the cylinder is displaced along the floor from the front end toward the rear end, and expresses the water in the hose in a first direction from the front end toward the rear end.

20 Claims, 13 Drawing Sheets

(56) References Cited

U.S. PATENT DOCUMENTS

| | | | |
|---|---|---|---|
| 3,353,787 A | 11/1967 | Semo | |
| 3,362,336 A | 1/1968 | Kafka | |
| 3,683,216 A | 8/1972 | Post | |
| 3,961,863 A | 6/1976 | Hooper, III | |
| 4,145,882 A | 3/1979 | Thorsheim | |
| 4,170,738 A | 10/1979 | Smith | |
| 4,223,240 A | 9/1980 | Theyse | |
| 4,228,360 A | 10/1980 | Navarro | |
| 4,268,226 A | 5/1981 | Morris | |
| 4,779,006 A | 10/1988 | Wortham | |
| 5,012,694 A | 5/1991 | McGrath | |
| 5,179,837 A | 1/1993 | Sieber | |
| 5,191,225 A | 3/1993 | Wells | |
| 5,217,324 A | 6/1993 | Freelain | |
| 5,268,608 A | 12/1993 | Bitterly et al. | |
| 5,329,497 A | 7/1994 | Previsic et al. | |
| 5,924,335 A | 7/1999 | Kuklo | |
| 5,941,132 A | 8/1999 | Kuklo | |
| 6,216,455 B1 | 4/2001 | Doleh et al. | |
| 6,711,897 B2 | 3/2004 | Lee | |
| 6,781,253 B2 | 8/2004 | Newman | |
| 6,849,984 B2 | 2/2005 | Gallant | |
| 6,883,399 B2 | 4/2005 | Burstall | |
| 7,023,104 B2 | 4/2006 | Kobashikawa et al. | |
| 7,105,972 B2 | 9/2006 | Gallant | |
| 7,131,269 B2 | 11/2006 | Koivusaari | |
| 7,525,214 B2 | 4/2009 | Atilano et al. | |
| 7,830,032 B1 | 11/2010 | Breen | |
| 7,930,885 B2 | 4/2011 | Brown | |
| 7,975,476 B2 | 7/2011 | Hatzilakos | |
| 7,980,071 B2 | 7/2011 | Farley et al. | |
| 8,008,792 B2 | 8/2011 | Gray | |
| 8,049,357 B2 | 11/2011 | Saavedra | |
| 8,093,743 B2 * | 1/2012 | Bozano | F03B 13/145 290/53 |
| 8,110,937 B2 | 2/2012 | Finnigan | |
| 8,581,432 B2 | 11/2013 | Rohrer | |
| 8,604,631 B2 | 12/2013 | Rohrer | |
| 8,633,608 B2 | 1/2014 | Grey et al. | |
| 8,668,472 B2 | 3/2014 | Tillotson | |
| 8,671,675 B2 * | 3/2014 | Cuong | F03B 13/20 290/42 |
| 8,677,743 B2 | 3/2014 | Pedersen | |
| 8,686,582 B2 | 4/2014 | Gardiner et al. | |
| 8,878,381 B2 | 11/2014 | Henry | |
| 8,907,514 B2 | 12/2014 | Peng et al. | |
| 9,018,779 B2 | 4/2015 | Yemm et al. | |
| 9,617,972 B1 | 4/2017 | Skaf | |
| 9,683,543 B2 | 6/2017 | Nozawa | |
| 9,780,624 B2 | 10/2017 | Li | |
| 9,784,238 B2 | 10/2017 | Degrieck et al. | |
| 9,847,697 B2 | 12/2017 | Degrieck et al. | |
| 9,863,395 B2 | 1/2018 | Rohrer | |
| 9,885,336 B2 | 2/2018 | Lim | |
| 9,909,554 B2 | 3/2018 | Ghiringhelli | |
| 9,938,167 B2 | 4/2018 | Su et al. | |
| 9,957,018 B1 * | 5/2018 | Angeliev | H02J 1/00 290/53 |
| 2003/0178972 A1 | 9/2003 | Burstall | |
| 2004/0007881 A1 | 1/2004 | Kobashikawa et al. | |
| 2004/0163387 A1 | 8/2004 | Pineda | |
| 2005/0127767 A1 | 6/2005 | Gallant | |
| 2006/0150626 A1 | 7/2006 | Koivusaari et al. | |
| 2007/0126239 A1 | 6/2007 | Stewart et al. | |
| 2007/0258771 A1 | 11/2007 | Weldon | |
| 2008/0050178 A1 | 2/2008 | Erlingsson | |
| 2008/0229745 A1 | 9/2008 | Ghouse | |
| 2009/0033162 A1 | 2/2009 | Dugas | |
| 2010/0102562 A1 | 4/2010 | Greenspan et al. | |
| 2010/0135767 A1 | 6/2010 | Arduini | |
| 2010/0219065 A1 | 9/2010 | Burns | |
| 2010/0308589 A1 | 12/2010 | Rohrer | |
| 2011/0006531 A1 * | 1/2011 | Ghouse | F03B 13/188 290/53 |
| 2011/0081259 A1 | 4/2011 | Vowles | |
| 2011/0254270 A1 | 10/2011 | Ayntrazi | |
| 2014/0077496 A1 | 3/2014 | Londono | |
| 2014/0363287 A1 | 12/2014 | Talarico | |
| 2015/0035283 A1 | 2/2015 | Lee | |
| 2015/0054285 A1 | 2/2015 | Hobdy | |
| 2016/0230739 A1 | 8/2016 | Diez | |
| 2016/0298595 A1 | 10/2016 | Kim | |
| 2017/0022964 A1 | 1/2017 | Rohrer | |
| 2017/0234291 A1 | 8/2017 | Noia | |
| 2017/0284359 A1 | 10/2017 | Burkle | |
| 2018/0128237 A1 * | 5/2018 | Laracuente-Rodriguez | F03B 15/00 |

FOREIGN PATENT DOCUMENTS

| | | |
|---|---|---|
| CN | 2789506 | 6/2006 |
| CN | 2906119 | 5/2007 |
| CN | 103629040 | 3/2014 |
| CN | 104791183 | 7/2015 |
| CN | 106150851 | 11/2016 |
| CN | 106194566 | 12/2016 |
| CN | 106368890 | 2/2017 |
| CN | 206722959 | 12/2017 |
| DE | 3228906 | 2/1984 |
| DE | 4143011 | 4/1993 |
| EP | 0017724 | 10/1980 |
| EP | 0151196 | 8/1985 |
| GB | 2081387 | 2/1982 |
| GB | 2081389 | 2/1982 |
| GB | 2433553 | 6/2007 |
| GB | 2467907 | 8/2010 |
| JP | S57165674 | 10/1982 |
| JP | S58174168 | 10/1983 |
| JP | S5993547 | 5/1984 |
| JP | 2012147620 | 8/2012 |
| MX | 2012005842 | 11/2013 |
| WO | WO2006/053356 | 5/2006 |
| WO | WO2008/022550 | 2/2008 |
| WO | WO2008/064691 | 6/2008 |
| WO | WO2010/004293 | 1/2010 |
| WO | WO2015/086625 | 6/2015 |
| WO | WO2018/024332 | 2/2018 |

* cited by examiner

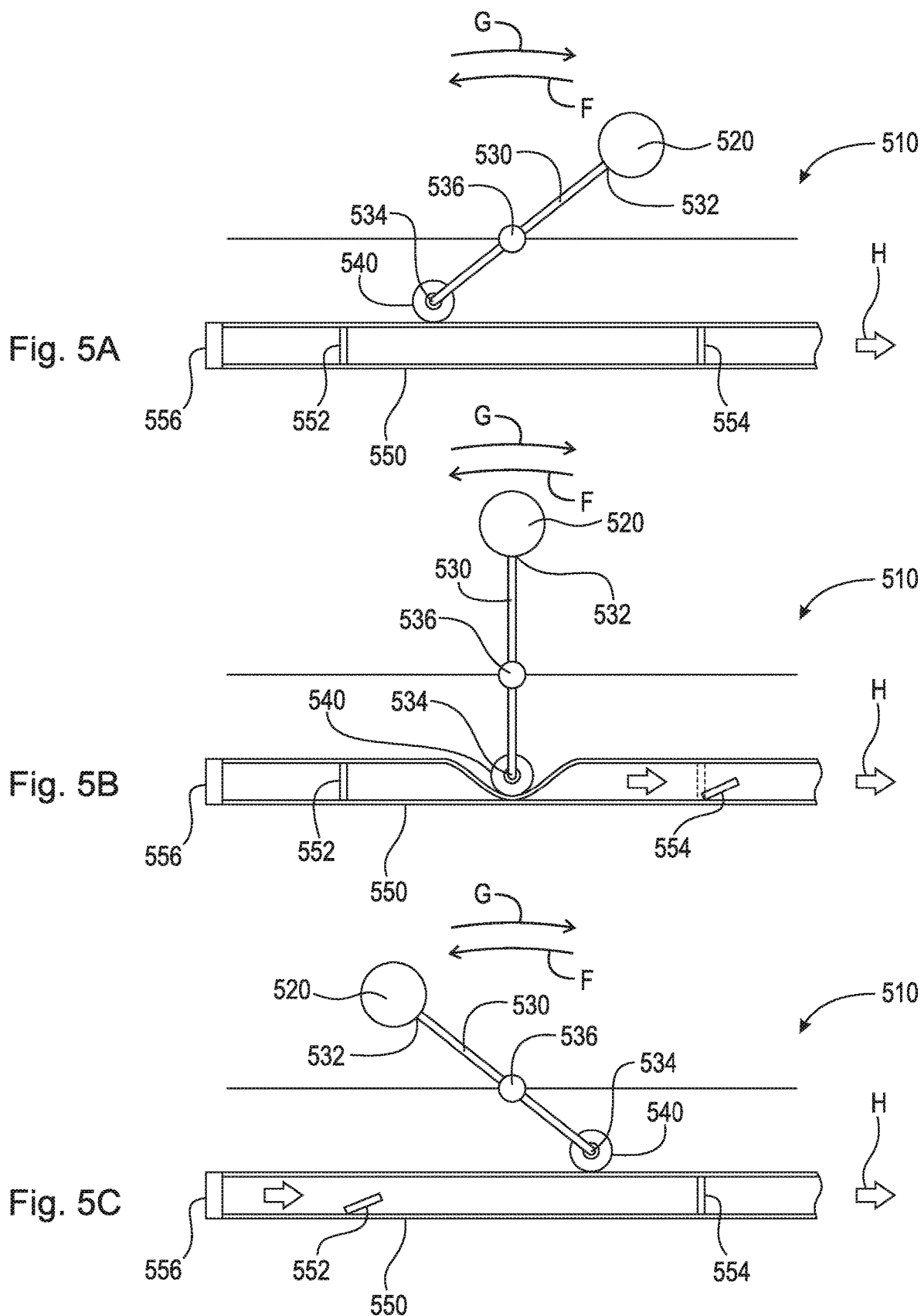

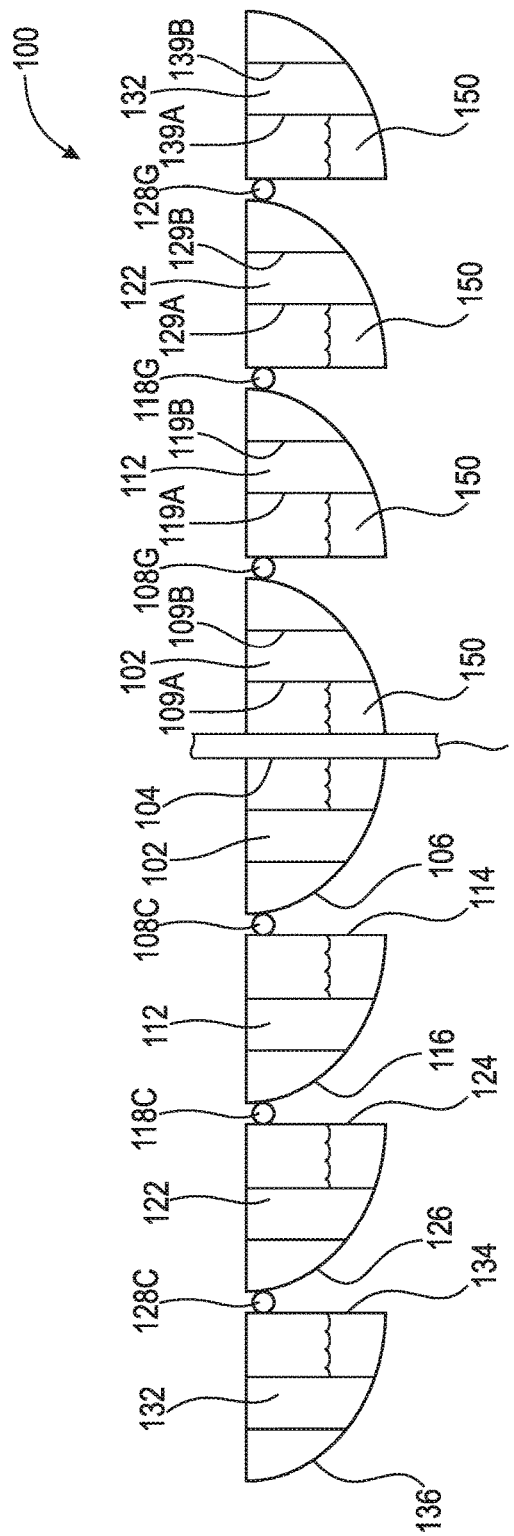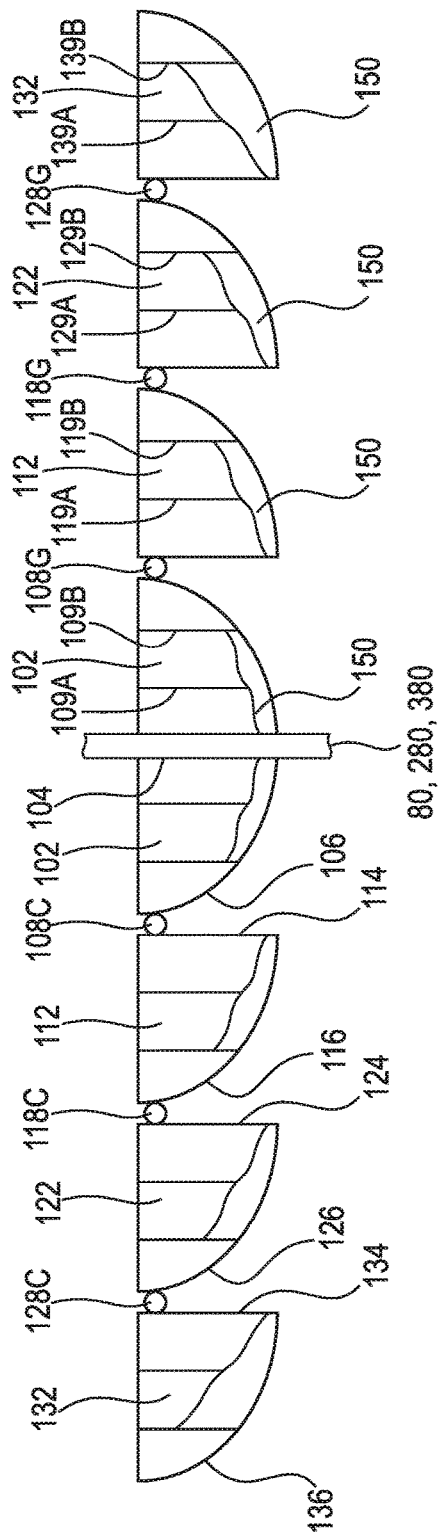

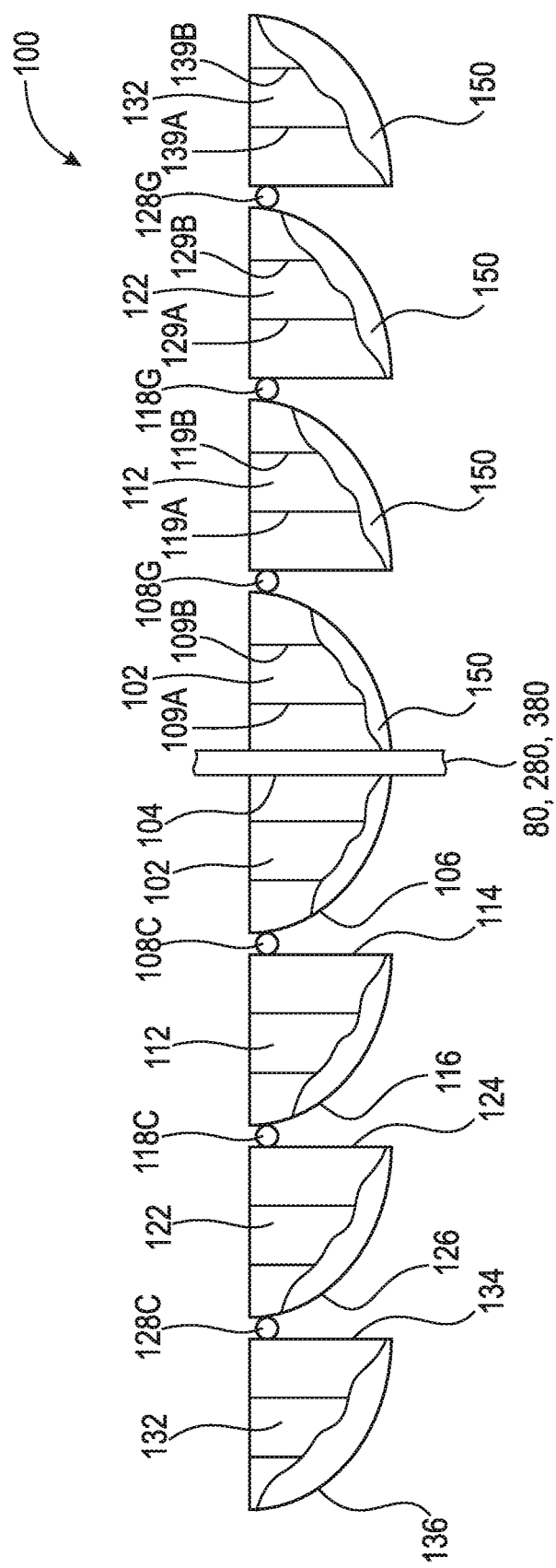

WAVE ENERGY CAPTURE DEVICE AND ENERGY STORAGE SYSTEM UTILIZING A VARIABLE MASS, VARIABLE RADIUS CONCENTRIC RING FLYWHEEL

CROSS-REFERENCE TO RELATED APPLICATIONS

This application is filed under 35 U.S.C. § 120 as a continuation of U.S. Non-Provisional patent application Ser. No. 16/176,094, filed on Oct. 31, 2018, which application is incorporated herein in its entirety.

FIELD

The present disclosure relates to wave energy capture devices, and more particularly, to wave energy capture devices that function in concert with a variable mass, variable radius concentric ring flywheel that permits simultaneous energy storage and energy conversion capabilities.

BACKGROUND

A cresting wave is an almost pure embodiment of captured kinetic and potential energy sourced by the sun. Mankind has long yearned to utilize this energy for purposes beyond the capricious exhilaration provided by a surfboard. As a consequence of this quest, numerous devices have been proposed to harness this energy, but virtually none have achieved much beyond a modicum of subsidized and propagandized commercial success.

The biggest challenge in energy capture resides in the unpredictability of the oscillatory nature of ocean waves, in amplitude, direction, and periodicity. Additional challenges reside in converting the massive monotony of wave energy into the hundreds of revolutions per minute required to produce useful mechanical or electrical energy. Finally, to achieve a seamless and constant supply of such converted energy, a storage mechanism is required for when the inevitable doldrums arrive. The summation of these challenges, therefore, is to provide for a device or devices that can capture the voluminous but slow kinetic energy of ponderous waves and convert them to high speed unidirectional continuous rotation of a shaft that can power a generator.

Thus, there is a long felt need for a wave energy capture device which is simple to manufacture and permits simultaneous energy storage and energy conversion capabilities.

SUMMARY

According to aspects illustrated herein, there is provided a wave energy capture device, comprising a wave chamber arranged to engage a body of water comprising a plurality of waves, including a floor having a front end and a rear end, a first opening arranged proximate the front end, a second opening arranged proximate the rear end, and a hose arranged on said floor and extending from the first opening to the second opening, the hose operatively arranged to fill with water from the body of water, and a cylinder arranged on the floor proximate the front end, the cylinder connected to the wave chamber via one or more springs, wherein, when one of the plurality of waves enters the first opening, the cylinder is displaced along the floor from the front end toward the rear end, and expresses the water in the hose in a first direction from the front end toward the rear end.

According to aspects illustrated herein, there is provided a wave energy capture device, comprising a wave chamber arranged to engage a body of water comprising a plurality of waves, including a floor having a front end and a rear end, the floor having a higher elevational value at the front end relative to the rear end, a first opening arranged proximate the front end, a second opening arranged proximate the rear end, and a hose arranged on said floor and extending from the first opening to the second opening, the hose operatively arranged to continuously fill with water from the body of water, and an object arranged on the floor proximate the front end, the object connected to the wave chamber via one or more springs, wherein, when one of the plurality of waves enters the first opening, the object is displaced from the front end toward the rear end, and expresses the water in the hose in a first direction from the front end toward the rear end.

According to aspects illustrated herein, there is provided a concentric ring flywheel arranged to interact with at least one stator for generating electrical current, the concentric ring flywheel comprising a shaft, a plurality of rings, the plurality of rings including at least a first ring, including a first radially inward facing surface arranged to connect with the shaft, and a first radially outward facing surface, a second ring arranged concentrically around the first ring, the second ring including a second radially inward facing surface, and a second radially outward facing surface, wherein a first space is arranged radially between the first radially outward facing surface and the second radially inward facing surface, and one or more first clutch connectors arranged in the first space to non-rotatably connect the second ring and the first ring.

According to aspects illustrated herein, there is provided an assembly for generating energy from waves, comprising a concentric ring flywheel operatively arranged to interact with at least one stator for generating electrical current, the concentric ring flywheel comprising a first shaft including an input end and an output end, a plurality of rings, the plurality of rings including at least a first ring, including a first radially inward facing surface arranged to connect with the output end of the first shaft, and a first radially outward facing surface, a second ring arranged concentrically around the first ring, the second ring including a second radially inward facing surface and a second radially outward facing surface, wherein a first space is arranged radially between the first radially outward facing surface and the second radially inward facing surface, one or more first clutch connectors arranged in the first space to non-rotatably connect the second ring and the first ring, and a wave energy capture device operatively arranged to rotate the first shaft.

It is an object of the present disclosure to provide a simple shore based mechanism for wave energy capture. Shore based capture is preferred for ease of maintenance of the device and because captured energy must ultimately be transferred to land to be stored, dispersed, and utilized. It is also an object of the present disclosure to provide a simple and efficient mechanism to store energy captured from waves to allow a consistent and seamless supply of power to the existing power grid.

To achieve these ends, wave energy capture is performed using one of four different mechanisms, though the energy storage mechanism described herein is compatible with any wave energy harvesting device, or indeed, any device producing energy.

In some embodiments, the wave energy capture device utilizes a float pivotally attached to a lever arm. The lever arm, in turn, is unique insofar as it varies in stiffness at opposite ends, with the changeable characteristic of the shaft occurring roughly at a fulcrum positioned along the shaft. The distal end of the lever arm is flexible and pivotally bound to said float. By being flexible, variations in wave energy can be moderated by converting the mechanical energy into elastomeric potential energy stored in the shaft. Further adaption to the wave amplitude can be achieved by a moveable fulcrum which translates along the shaft in a forward or backward direction depending on the need to control energy transfer. The position of the shaft proximal to the mobile fulcrum is stiffer and it's up and down excursions are limited by an oscillation restrictor to prevent damage to the energy capture mechanism. The energy capture mechanism employs, in the simplest iteration, a free wheel mechanism or a spiral plunger mechanism to convert oscillatory motion to rotary motion. These mechanisms, for example, may be similar to those used in the pedal mechanism of a bicycle or, in the case of the spiral plunger mechanism, a toy pump top. However, it is understood that a variety of mechanical devices that convert oscillatory motion to rotator motion could be employed.

Once energy conversion to rotary form has been achieved, by whatever mechanism, the energy so produced is immediately stored in a concentric ring variable mass, variable radius flywheel such that the unpredictable wave energy can be continuously and controllably accessed. A flywheel is the preferred embodiment because they can achieve energy storage efficiently that exceeds 90% whereas battery storage is around 30-40%. Flywheels also cause less damage to the environments, function over a wider temperature range than a battery and require low maintenance. James Watt's steam engine flywheels continue to work after 200 years. The flywheel employed in this energy storage is unique and will be described in detail.

In some embodiments, the wave energy capture device involves a shore based wave chamber containing a heavy cylinder pivotally attached at each end to a spring or similar elastomeric device. The floor of the wave chamber is sinusoidal or curved such that when the cylinder is pushed away from the intake opening by a wave, the cylinder rolls away from its resting place and then down along a curved surface and then up the distal wall until all kinetic energy is expanded, whereupon the cylinder falls back and is pulled by the springs to its resting place until displaced by the next wave.

As the cylinder is displaced by the wave it compresses an elastomeric compartment or hose or series thereof positioned along the floor of the wave chamber. The elastomeric chambers or hoses are, in turn, connected to a non-elastomeric hose or pipe containing one way valves. As the compressing cylinder rolls along the sinusoidally shaped floor it compresses elastomeric hoses or compartments along the floor of the wave chamber. The water contained within the compressible hose or compartments is displaced out of the chamber and up a pipe or conduit toward an elevated container or cistern. One way valves within the conduit prevent return of expressed water into the chamber such that each sequential wave displacement forces water into the cistern thereby converting kinetic energy into potential energy. The water contained in the cistern is then released to either directly power a turbine to generate electrical energy or transferred to a flywheel for storage prior to conversion to electrical energy.

The amount of energy captured can be varied dependent upon the height and periodicity of the waves and controlled by a number of factors, for example, size and weight of the cylinders, caliber of the elastomeric hose and conduits or compressible compartments, distance between one way valves (volume of water contained therein), height of the cistern, and the mass and speed of the flywheel (if used).

Many of the components of the peristaltic wave pumps can be made of cement or plastics that resist corrosion and hence function longer in a marine environment.

In some embodiments, the wave energy capture device employs a linear actuator-type absorber, which functions as a sinusoidal pump. This iteration involves a series of mechanical pumps connected in series like beads on a string. The rising force of a wave or swell causes angular flexion between segments of the linear actuator, which is positioned perpendicular to the direction off the waves.

Flexion up or down tautens a cable connected to a piston valve contained within a segment. The cable pulls the piston linearly along a segment and displaces water contained therein into a flexible fabric hose strung in parallel along the linear actuator via a one-way valve. When the flexed segment returns to a neutral position, a spring or elastomeric member pulls the piston back into position and water refills the chamber through a separate one-way valve. The tautening cables are positioned via pulleys such that a flexion force triggered by the rise and fall of a wave will displace the piston pump no matter which direction the wave displaces adjacent segments. In this fashion, water can be pumped with either the rise or the fall of a wave. Displaced water, in turn, is pushed along the linear actuator via the fabric hose and into a cistern where it is stored as potential energy to be utilized later.

In some embodiments, the wave energy capture device employs a peristaltic pump application that is not surface-based. The wave energy capture device captures wave energy on the ocean floor so that it can be employed or deployed in areas with high surface recreational activity. This iteration employs a fan shaped wave capture device oriented in parallel to an incoming wave. As waves approach a shore, the base of the wave is actually in contact with the ocean floor and accounts for the "to and fro" motion observed in sea weed and kelp that grow up from the bottom. Any scuba diver will attest to the significant force of these invisible waves that manifest their surface extensions as varying undulations or white caps. The force not only moves giant kelp plants forward and then backward, but can also displace large objects in a similar fashion.

To capture this deep wave energy, a fan shaped actuator is attached to a stem which in turn is pivotally attached to a floor based anchor. Said anchor, in turn, contains a fabric hose which can be compresses in a peristaltic fashion when the wave capture device moves to and fro. The fabric hose contains one-way valves that allow displaced water to be pumped to a land based cistern, which in turn stores the water for later release to power a turbine. The sea floor-based peristaltic pumps can be placed in series along a single compressible hose or vessel, or in parallel such that multiple pumps can operate unseen beneath the waves at any one time. In this fashion, numerous peristaltic pumps can operate to fill one or more cisterns thereby exploiting the kinetic energy of waves and tides in a continuous fashion.

The present disclosure also includes a unique flywheel configuration that serves to store energy but also can be utilized to generate electrical energy by virtue of the fact that the energy is stored as rotational kinetic energy and that rotational kinetic energy is easily converted to electrical energy by placing copper coiling around magnetic rotors located in the perimeter of the flywheel, or one or more of its' concentric ring subparts.

The present disclosure utilizes a concentric ring flywheel design with each ring planar to the next ring but rotating on separate mechanical or magnetic bearings such that each ring is capable of being spun or rotated at a different speed than the others. A shaft would drive the innermost ring like a conventional flywheel, and, by virtue of its' smaller size, the inner ring would be easier to power up by virtue of its' lesser mass and radius.

On the outer surface of each ring are contact points that are reversibly contacted with the inner circumference of the adjacent ring. These contact points are actuated like a centrifugal clutch in the purely mechanical iteration, or electronically via wireless communication, for example, Bluetooth® wireless communication, in the computerized electronic version.

In the mechanical version of the concentric ring flywheel, once the inner ring reaches a predetermined speed in revolutions per minute (RPM), the outer centrifugal clutch engages the adjacent outer ring and starts it spinning. Once the adjacent ring reaches a predetermined speed its outer centrifugal clutch engages the next ring such that progressively greater amounts of energy can be stored by transferring energy to adjacent rings. If the shaft RPM drops, the centrifugal clutch in its' outer perimeter disengages so that the adjacent ring continues to spin unencumbered by the lapse in energy input. In energy rich times, progressively more energy is shifted to the outer more massive rings capable of greater energy storage. It is anticipated that electrical energy will be more consistently generated from outer rings of the concentric flywheel, which are more likely to retain a more constant degree of angular momentum, particularly in the mechanical centrifugal clutch version.

In the electronic version of the concentric ring flywheel, connection between concentric rings is controlled by a computer that calculates the optimal RPM to transfer energy between rings and activates the electronic clutch mechanism between rings via a wireless type of connection (i.e., wireless communication). In this fashion, both mass and radius can be varied almost instantaneously in an effort to keep one of the rings spinning at a constant rate to ensure that the oscillation energy in a wave can be converted to a consistent stable and accessible energy source. For example, middle rings could be kept at an optimal 1,800 RPM by transferring stored energy from an outer ring inward or from an inner ring outward.

In some embodiments, the concentric rings are arranged on magnetic bearings, in a vacuum, whereupon energy efficiency can exceed 95%.

The shaft connection with the innermost ring would employ a free wheel or other clutch mechanism with variable gearing that promotes the highest RPM to energy input achievable. In some embodiments, the gear selection would be computerized and electronically selected as well, in a manner similar to an automatic transmission in a vehicle.

In times of low wave energy input, the shaft may disconnect from the flywheel to limit frictional energy loss but in times of high wave energy input the energy would be progressively transferred to the larger, heavier output rings having greater angular momentum and hence greater energy storage. By locating rotors adjacent to the concentric rings, the concentric flywheel assembly can serve simultaneously for energy storage and for conversion of kinetic energy into electrical energy.

To achieve even greater energy density and control, each of the concentric rings, while planar on the top, will have a non-planar or parabolic undersurface. The space between the upper and lower surfaces in turn, would be hollow and contain fluid such as water in the simplest iteration, or mercury if high mass is deemed desirable. Additionally, the lower surface will have ridges or concentric compartments with centrifugally or electronically controlled gates to allow control of the fluid as centrifugal force pushes it outward and up the incline toward adjacent compartments. Greater angular velocity would concentrate fluid toward the outer edge of a concentric ring and lower angular velocity would allow gravity to draw the fluid back inward and restore mass concentration centrally. Ridges would control the transfer of fluid in the simplest iteration and concentric compartments would control fluid transfer via electronic or centrifugally controlled gates in the more complex version.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 5A is an elevational view of a wave energy capture device in a first position;

FIG. 5B is an elevational view of the wave energy capture device shown in FIG. 5A, in a second position;

FIG. 5C is an elevational view of the wave energy capture device shown in FIG. 5A, in a third position;

FIG. 10A is a cross-sectional view of the flywheel taken generally along line 10-10 in FIG. 8, in a first state;

FIG. 10B is a cross-sectional view of the flywheel taken generally along line 10-10 in FIG. 8, in a second state; and, FIG. 10C is a cross-sectional view of the flywheel taken generally along line 10-10 in FIG. 8, in a third state.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

Figure 1:
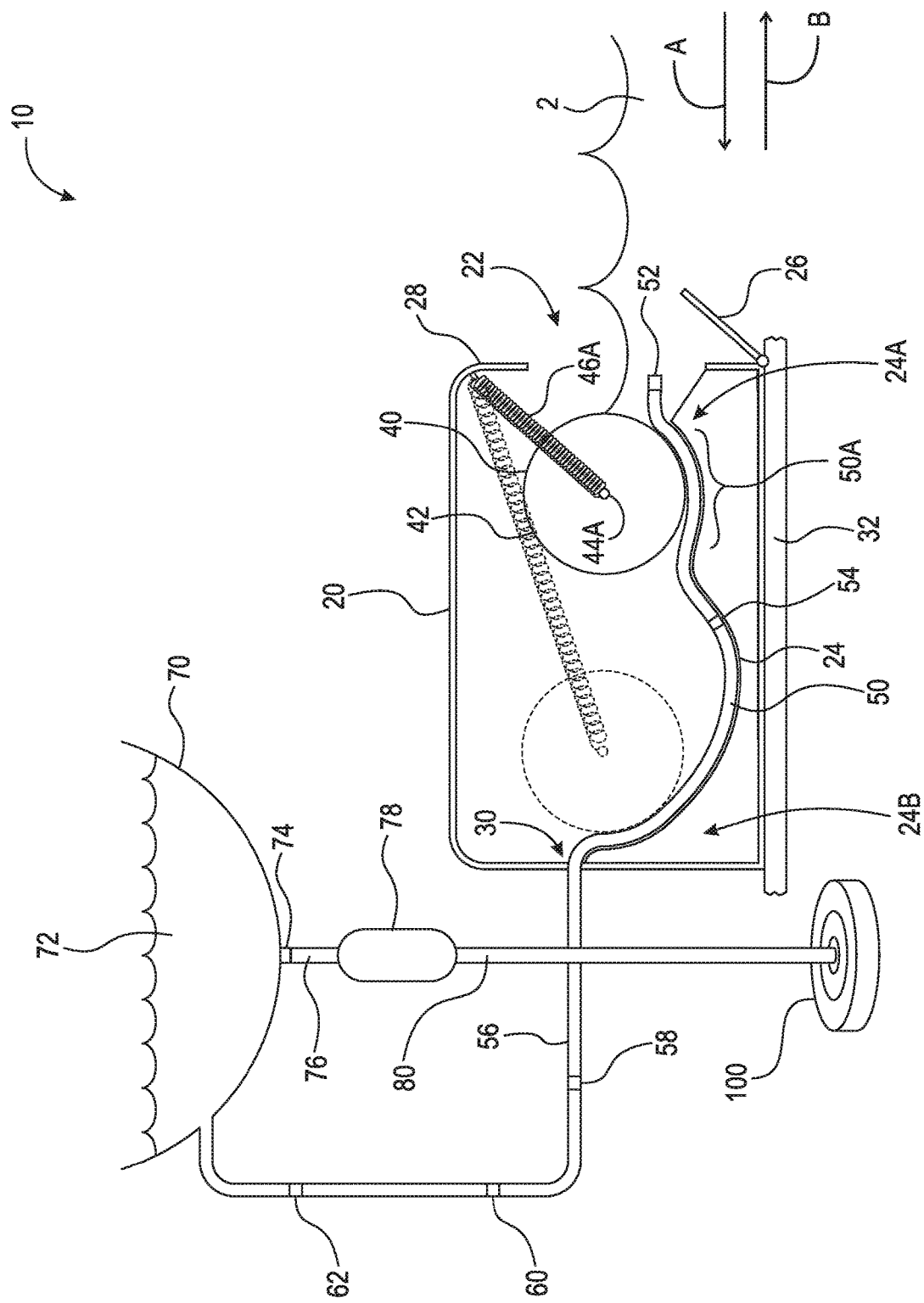
FIG. 1 is an elevational view of a wave energy capture device.

Referring now to the figures, FIG. 1 is an elevational view of wave energy capture device 10. Wave energy capture device 10 generally comprises wave chamber 20, cylinder 40, hose 50, cistern 70, and flywheel 100.

Chamber 20 comprises opening 22, floor 24, section 28, and opening 30. Floor 24 is curvilinear (e.g., sinusoidally shaped) and includes end 24A and end 24B. End 24A is arranged in the front of wave chamber 20 proximate opening 22, whereas end 24B is arranged in the rear of wave chamber 20 proximate opening 30. In some embodiments, floor 24 is linear. In some embodiments, floor 24 is linear and sloped downward from end 24A to end 24B. Section 28 is generally an overhang arranged above floor 24. Chamber 20 is positioned at least partially in water 2 such that waves flow into and out of opening 22. For example, chamber 20 may be arranged on a shore adjacent a body of water such that waves flow in and out thereof. Chamber 20 may further comprise wave gate 26 which is rotatably connected to chamber 20 proximate end 24A to regulate the magnitude of the waves entering opening 22. Wave gate 26 may be adjusted manually or be controlled remotely via wireless communication. For example, wave gate 26 may be connected to a motor having a wireless communication receiver. A wireless communication transmitter may be used to send a signal to the wireless communication receiver to activate the motor and position wave gate 26 accordingly. If the magnitude of the waves of water 2 are, for example, very large, wave gate 26 may be raised in order to reduce the wave magnitude entering opening 22. If the magnitude of the waves of water 2 are, for example, moderate to small, wave gate 26 may be lowered to allow the full magnitude of the waves to enter opening 22. In some embodiments, wave chamber 20 is connected to rail 32. Rail 32 allows chamber 20 to be repositioned for tidal adjustments, via, for example, a sliding engagement therebetween. In low tide environments, wave chamber 20 may be adjusted in direction B relative to rail 32. In high tide environments, wave chamber 20 may be adjusted in direction A relative to rail 32.

Hose 50 is arranged along floor 24. Hose 50 is at least partially elastomeric. By elastomeric, it is meant that hose 50 is compressible and will return to its original shape after being compressed. In some embodiments, hose 50 is completely elastomeric. In some embodiments, hose 50 is partially elastomeric and partially rigid, for example, portion 50A may be rigid. Hose 50 comprises intake valve 52. Water 2 enters hose 50 via intake valve 52 and fills hose 50. Hose 50 further comprises one or more one-way valves. Intake valve 52 may be, for example, a one-way valve. In some embodiments, negative pressure within hose 50, created by elastomeric hose 50 returning to its original shape after being compressed, causes water 2 to be sucked into intake valve 52. In some embodiments, intake valve 52 and portion 50A are completely submerged in water 2, thereby allowing for portion 50A to be constantly filled with water. Hose 50 extends from intake valve 52, which is positioned at opening 22, to opening 30 where it is connected to conduit 56. In the embodiment shown, hose 50 comprises one one-way valve 54. It should be appreciated that hose 50 may comprise any number of valves suitable for expressing water therein to conduit 56, as will be discussed in greater detail below. In some embodiments, wave energy capture device 10 comprises a plurality of hoses arranged along floor 24.

Cylinder or object or float 40 is positioned in wave chamber 20 and comprises radially outward facing surface 42. Cylinder 40 is connected to chamber 20, specifically overhang section 28, via one or more springs. In the embodiment shown, spring 46A connects cylinder 40 to section 28 via point 44A, and spring 46B (not shown) connects cylinder 40 to section 28 via point 44B (not shown). In some embodiments, cylinder 40 is at least partially hollow and is arranged to roll and/or slide along floor 24 and on top of hose 50. In some embodiments, cylinder 40 is not hollow. It should be appreciated that cylinder 40 may comprise any geometry suitable to compress hose 50 and express fluid therethrough. Waves containing kinetic energy enter wave chamber 20 through opening 22, the magnitude of said waves being controlled by wave gate 26. Wave energy pushes cylinder 40 off its mooring proximate end 24A and down the ramped floor 24 thereby compressing hose 50. Water filling hose 50, which entered via intake valve 52, is expressed along hose 50 generally in direction A. One-way valve 54 ensures that water in hose 50 travel in only one direction, toward opening 30 and conduit 56 (generally direction A). Once cylinder 40 has been forced to the rear of wave chamber 20 (i.e., proximate end 24B) thereby expressing all of the water out of hose 50, it is drawn back to its original position proximate end 24A and opening 22 by springs 46A and 46B (not shown) so that the cycle can begin again. The movement of cylinder 40 in wave chamber 20 is shown by phantom lines in FIG. 1. In some embodiments, the compressible or elastomeric or peristaltic hose 50 is supplemented with or replaced by a positive displacement pump similar to the segments shown in FIGS. 4A-B below. In such an embodiment, object or cylinder 40 compresses a piston or portion of the pump to express water toward opening 30, and when object or cylinder 40 returns to its original position, the piston or portion of the pump releases thus sucking more water into hose 50 (e.g., through intake valve 52). Essentially, the embodiment shown in FIG. 1 acts as a positive displacement pump since compression of hose 50 expresses water toward opening 30 and expansion of hose 50 sucks more water therein.

Water is expressed from hose 50 into conduit 56. Water travels through conduit 56 in a singular direction, due to one-way valves 58 and 60 arranged therein, and fills cistern 70. It should be appreciated that, although FIG. 1 shows only two one-way valves arranged in conduit 56, conduit 56 may comprise any number of one-way valves suitable to displace water from hose 50 to cistern 70, for example, one or more one-way valves. As shown, collected water 72 is held in cistern 70 until it is released through valve 74. Once released, water 72 travels through conduit 76 through turbine 78, thereby creating rotational movement of shaft 80. Turbine 78 is generally a machine for producing continuous power in which a wheel or rotor, typically fitted with vanes, is made to revolve by a moving flow of water or fluid, as is known in the art. Turbine 78 can, on its own, generate electrical power. In some embodiments, turbine 78 rotates shaft 80 which in turn activates flywheel 100 to produce and/or store energy (e.g., electrical power), as will be discussed in greater detail below. In some embodiments, turbine 78 is non-rotatably connected to shaft 80 so as to rotate flywheel 100. It should be appreciated that as wave energy capture device 10 pumps water from wave chamber 20 to cistern 70, the kinetic energy of waves is converted to potential energy. Subsequently, as water 72 is released through valve 74, potential energy is converted to kinetic energy.

Figure 2:
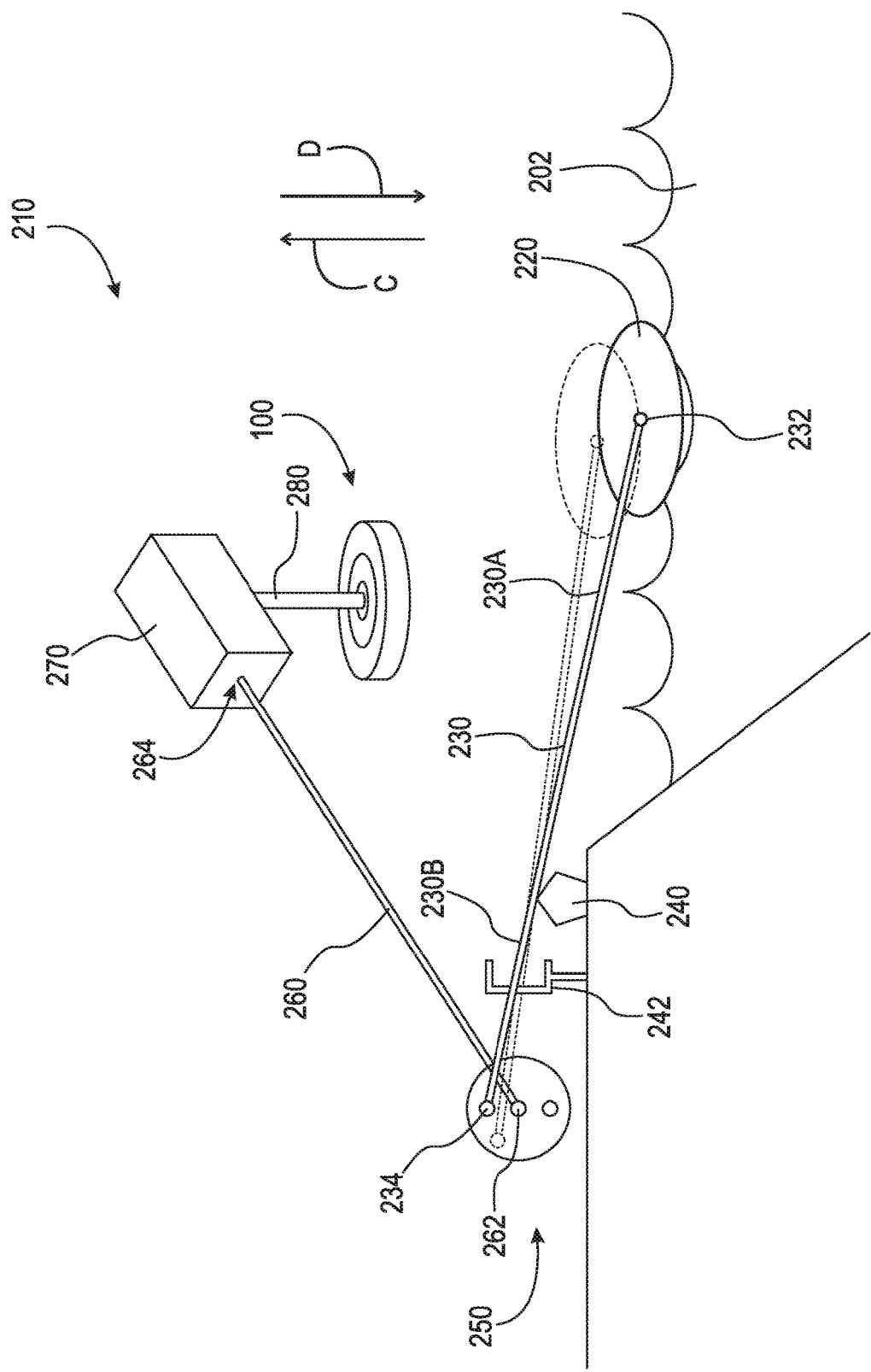
FIG. 2 is a perspective view of a wave energy capture device.

FIG. 2 is a perspective view of wave energy capture device 210. Wave energy capture device 210 generally comprises float 220, shaft 230, and wheel 250.

Float 220 is a structure that is buoyant in water or other fluid. Float 220 is arranged in water 202 and can be any suitable shape, such as, for example, partially spherical-, spherical-, cylindrical-, rectangular prism-, cube-, triangular prism-, or pyramidal-shaped. The purpose of float 220 is to displace in directions C and D due to the waves of water 202.

Shaft 230 generally comprises end 232 and end 234. End 232 is connected to float 220. End 234 is connected to wheel 250. Shaft 230 comprises flexible portion 230A and stiff portion 230B. In some embodiments, shaft 230 is completely stiff. In some embodiments, shaft 230 is completely flexible. Shaft 230 is arranged on fulcrum 240. Fulcrum 240 engages shaft 230 at a point between end 232 and end 234. Fulcrum 240 is the point on which shaft 230 rests or is supported and on which shaft 230 pivots. Wave energy capture device 210 may further comprise oscillation restrictor 242. Oscillation restrictor 242 is arranged to limit the displacement of shaft 230. For example, when the magnitude of the waves of water 202 is too great, float 220 may be displaced at a level that may jeopardize the structural integrity of the components of wave energy capture device 210. Oscillation restrictor 242 is arranged to prevent such extreme displacement of float 220 and shaft 230.

Wheel 250 is connected to shaft 230 at end 234. End 234 is pivotably connected to wheel 250, such that wheel 250 can rotate as shaft 230 oscillates in directions C and D. Wheel 250 is arranged to convert the oscillatory motion of float 220 and shaft 230 to rotational motion. As shown, end 234 is connected to wheel 250 such that as shaft 230 pivots about fulcrum 240, wheel 250 rotates. In some embodiments, wheel 250 may comprise a freewheel or overrunning clutch (i.e., similar to those used in the pedal mechanism of a bicycle). In some embodiments, wheel 250 may comprise a ratchet device which allows wheel 250 to displace in a first circumferential direction but prevents wheel 250 from displacing in a second circumferential direction, opposite the first circumferential direction. In some embodiments, wheel 250 comprises a scotch tension wheel design.

Shaft 260 comprises end 262 and end 264. End 262 is non-rotatably connected to wheel 250. End 264 is connected to, for example, gearbox 270. Wheel 250 rotates shaft 260. Gearbox 270 transfers the rotational energy of shaft 260 to shaft 280, which in turn, activates flywheel 100 to produce and/or store energy (e.g., electrical power), as will be discussed in greater detail below. It should be appreciated that shaft 260, specifically end 264, may be connected to any device suitable for producing energy (e.g., electrical power).

Figure 3:
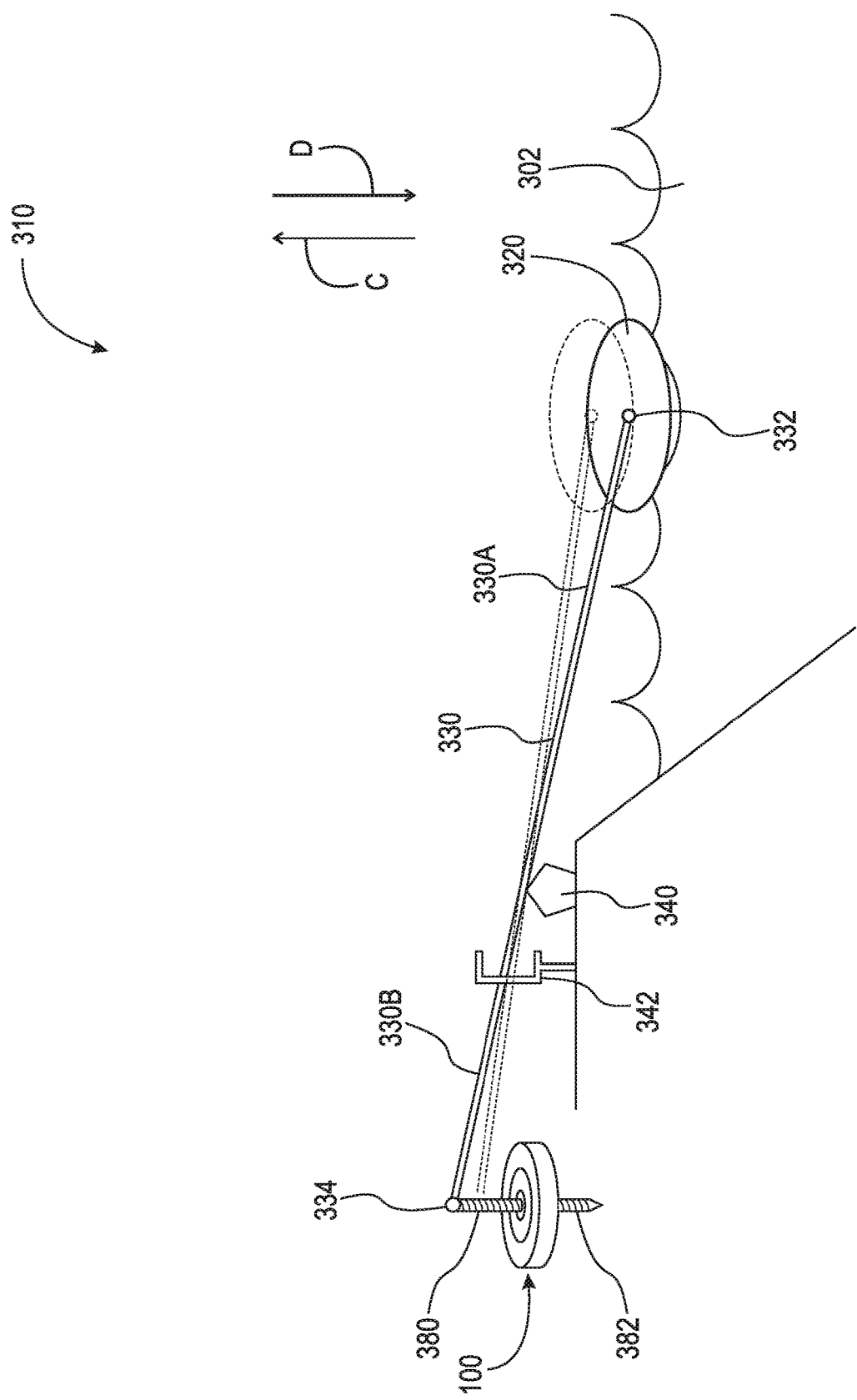
FIG. 3 is a perspective view of a wave energy capture device.

FIG. 3 is a perspective view of a wave energy capture device 310. Wave energy capture device 310 generally comprises float 320, shaft 330, and shaft 380.

Float 320 is a structure that is buoyant in water or other fluid. Float 320 is arranged in water 302 and can be any suitable shape, such as, for example, partially spherical-, spherical-, cylindrical-, rectangular prism-, cube-, triangular prism-, or pyramidal-shaped. The purpose of float 320 is to displace in directions C and D due to the waves of water 302.

Shaft 330 generally comprises end 332 and end 334. End 332 is connected to float 320. End 334 is connected to shaft 380. Shaft 330 comprises flexible portion 330A and stiff portion 330B. In some embodiments, shaft 330 is completely stiff. In some embodiments, shaft 330 is completely flexible. Shaft 330 is arranged on fulcrum 340. Fulcrum 340 engages shaft 330 at a point between end 332 and end 334. Fulcrum 340 is the point on which shaft 330 rests or is supported and on which shaft 330 pivots. Wave energy capture device 310 may further comprise oscillation restrictor 342. Oscillation restrictor 342 is arranged to limit the displacement of shaft 330. For example, when the magnitude of the waves of water 302 is too great, float 320 may be displaced at a level that may jeopardize the structural integrity of the components of wave energy capture device 310. Oscillation restrictor 342 is arranged to prevent such extreme displacement of float 320 and shaft 330.

Shaft 380 is connected to shaft 330 at end 334. End 334 is pivotably connected to shaft 380, such that as shaft 330 oscillates in directions C and D, shaft 380 maintains its linear displacement action in directions C and D. Shaft 380 comprises threading 382 thereon. As shaft 380 is displaced in directions C and D, threading 382 interacts with threading on radially inward facing surface 104 of ring 102 of flywheel 100 to rotate flywheel 100 (flywheel, including radially inward facing surface 104 and ring 102, will be discussed in greater detail below). The interaction between external threading 382 of shaft 380 and the internal threading of flywheel 100 creates a spiral plunger mechanism which activates/rotates flywheel 100 to produce and/or store energy (e.g., electrical power). This spiral plunger mechanism may be, for example, similar to a toy pump top. It should be appreciated that any mechanical device suitable for converting oscillatory motion into rotary motion may be used.

Figure 4A:
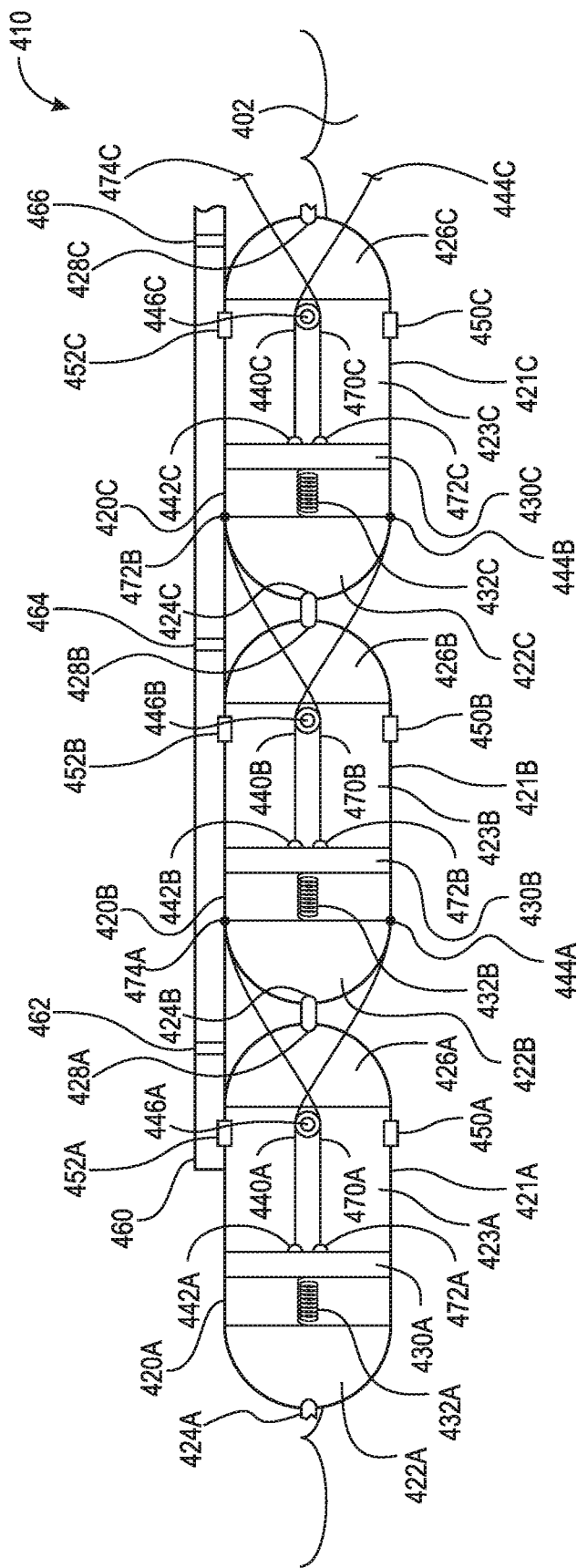
FIG. 4A is a cross-sectional view of a wave energy capture device in a relaxed state.
Figure 4B:
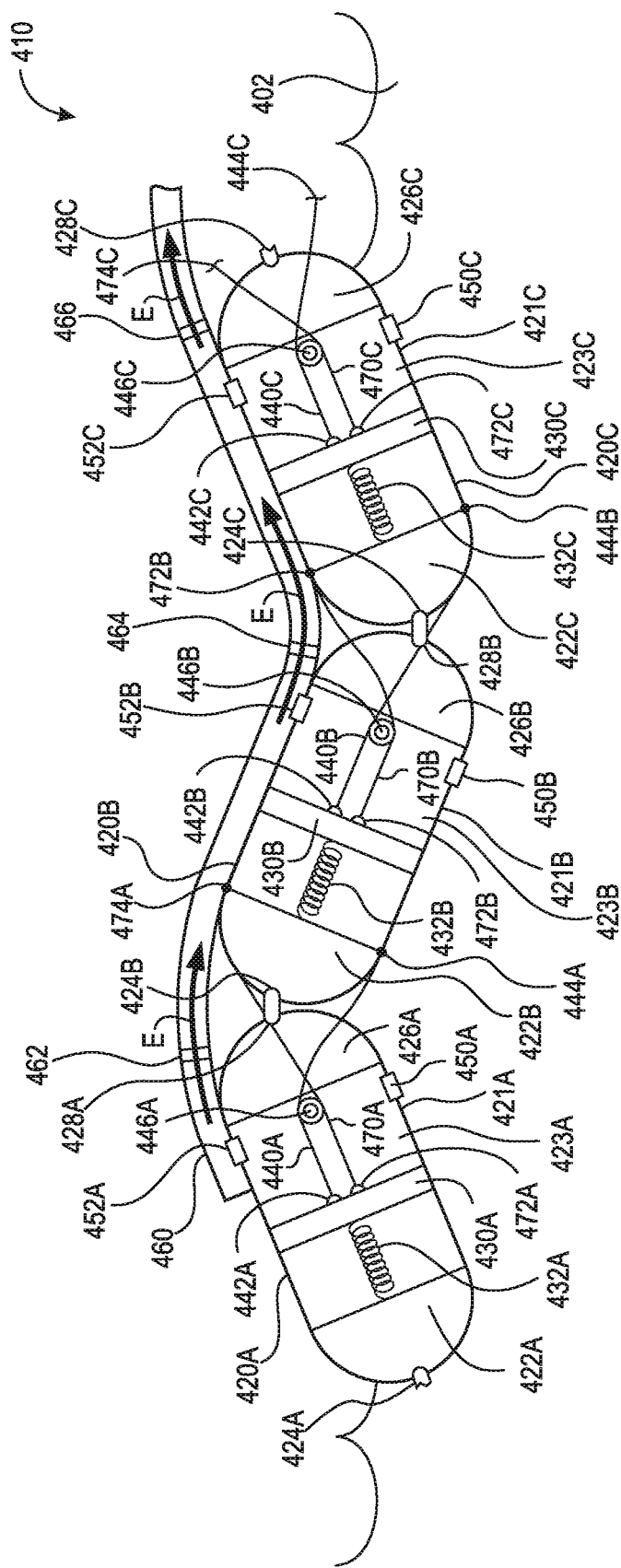
FIG. 4B is a cross-sectional view of the wave energy capture device shown in FIG. 4A, in a flexed state.

FIG. 4A is a cross-sectional view of wave energy capture device 410 in a relaxed state. FIG. 4B is a cross-sectional view of wave energy capture device 410 in a flexed state. Wave energy capture device 410 generally comprises pump segments 420A-C and hose 460. In the embodiment shown, wave energy capture device 410 comprises pump segments 420A, 420B, and 420C. It should be appreciated, however, that wave energy capture device 410 may comprise any suitable number of pump segments, for example, a plurality of pump segments. In some embodiments, wave energy capture device 410 only comprises one pump segment that is connected to a fixed object to create the piston movement required, as will be discussed in greater detail below. Wave energy capture device 410 is arranged in water 402, either to float atop thereon, to be partially submerged therein, or to be fully submerged therein.

Pump segment 420A comprises lateral wall 421A, end 422A, and end 426A. End 422A is generally rounded, or partially circular or partially ellipsoidal, and comprises fulcrum 424A. End 426A is generally rounded, or partially circular or partially ellipsoidal, and comprises fulcrum 428A. It should be appreciated that ends 422A and 426A may comprise any suitable geometry for pivoting against adjacent pump segments or objects, for example, triangular. Lateral wall 421A is arranged between ends 422A and 426A.

Pump segment 420A further comprises piston 430A arranged therein. Piston 430A is connected to end 422A via spring 432A. Piston 430A forms chamber 423A along with lateral wall 421A and end 426A. Chamber 423A is sealed and fluid may not enter or exit chamber 423A except through valves 450A and 452A, as will be discussed in greater detail below. Pump segment 420A further comprises cord 440A, cord 470A, and pulley 446A. Cord 440A comprises end 442A, which is connected to piston 430A, and end 444A, which is connected to end 422B of adjacent pump segment 420B. Cord 470A comprises end 474A, which is connected to piston 430A, and end 474A, which is connected to end 422B of adjacent pump segment 420B. Pulley 446A is rotatably connected to end 426A and engages cord 440A and cord 470A. In some embodiments, pulley 446A is non-rotatably connected to end 426A. As shown, cord 440A wraps at least partially around pulley 446A, and cord 470A wraps at least partially around pulley 446A. Pulley 446A allows pump segment 420A to pivot about fulcrum 428A relative to fulcrum 424B of pump segment 420B. In some embodiments, pump segment 420A is pivotably connected to pump segment 420B at fulcrums 428A and 424B.

Pump segment 420A further comprises valves 450A and 452A. Valve 450A is an inlet valve and is arranged to allow water 402 to enter chamber 423A when wave energy capture device 410 is in the relaxed state or returning to the relaxed state from the flexed state. Valve 452A is an outlet valve and is arranged to allow water from inside chamber 423A to enter hose 460. In some embodiments, valves 450A and 452A are one-way valves. As pump segment 420A pivots with respect to pump segment 420B (i.e., as in the flexed state of FIG. 4B), depending on the rotational direction of the pivot, either cord 440A or 470A will taughten about pulley 446A, thereby pulling piston 430A toward end 426A. As piston 430A displaces toward end 426A, water in chamber 423A is forced out of valve 452A and into hose 460. As shown in FIG. 4B, cord 440A is tautened thus pulling piston 430A toward end 426A. As pump segment 420A returns to a non-pivoted position (i.e., aligned as in the relaxed state of FIG. 4A), the tension of the taughtened cords, either cord 440A or cord 470A, releases and spring 432A displaces piston 430A back toward end 422A. As piston 430A is displaced toward end 422A, water 402 is sucked into chamber 423A through valve 450A via the negative pressure created therein. As such, pump 420A is arranged to, using the wave energy of water 402, continuously pump water into hose 460.

Pump segment 420B comprises lateral wall 421B, end 422B, and end 426B. End 422B is generally rounded, or partially circular or partially ellipsoidal, and comprises fulcrum 424B. End 426B is generally rounded, or partially circular or partially ellipsoidal, and comprises fulcrum 428B. It should be appreciated that ends 422B and 426B may comprise any suitable geometry for pivoting against adjacent pump segments or objects, for example, triangular. Lateral wall 421B is arranged between ends 422B and 426B.

Pump segment 420B further comprises piston 430B arranged therein. Piston 430B is connected to end 422B via spring 432B. Piston 430B forms chamber 423B along with lateral wall 421B and end 426B. Chamber 423B is sealed and fluid may not enter or exit chamber 423B except through valves 450B and 452B, as will be discussed in greater detail below. Pump segment 420B further comprises cord 440B, cord 470B, and pulley 446B. Cord 440B comprises end 442B, which is connected to piston 430B, and end 444B, which is connected to end 422C of adjacent pump segment 420C. Cord 470B comprises end 474B, which is connected to piston 430B, and end 474B, which is connected to end 422C of adjacent pump segment 420C. Pulley 446B is rotatably connected to end 426B and engages cord 440B and cord 470B. In some embodiments, pulley 446B is non-rotatably connected to end 426B. As shown, cord 440B wraps at least partially around pulley 446B, and cord 470B wraps at least partially around pulley 446B. Pulley 446B allows pump segment 420B to pivot about fulcrum 428B relative to fulcrum 424C of pump segment 420C. In some embodiments, pump segment 420B is pivotably connected to pump segment 420C at fulcrums 428B and 424C.

Pump segment 420B further comprises valves 450B and 452B. Valve 450B is an inlet valve and is arranged to allow water 402 to enter chamber 423B when wave energy capture device 410 is in the relaxed state or returning to the relaxed state from the flexed state. Valve 452B is an outlet valve and is arranged to allow water from inside chamber 423B to enter hose 460. In some embodiments, valves 450B and 452B are one-way valves. As pump segment 420B pivots with respect to pump segment 420C (i.e., as in the flexed state of FIG. 4B), depending on the rotational direction of the pivot, either cord 440B or 470B will taughten about pulley 446B, thereby pulling piston 430B toward end 426B. As piston 430B displaces toward end 426B, water in chamber 423B is forced out of valve 452B and into hose 460. As shown in FIG. 4B, cord 470B is tautened thus pulling piston 430B toward end 426B. As pump segment 420B returns to a non-pivoted position (i.e., aligned as in the relaxed state of FIG. 4A), the tension of the taughtened cords, either cord 440B or cord 470B, releases and spring 432B displaces piston 430B back toward end 422B. As piston 430B is displaced toward end 422B, water 402 is sucked into chamber 423B through valve 450B via the negative pressure created therein. As such, pump 420B is arranged to, using the wave energy of water 402, continuously pump water into hose 460.

Pump segment 420C comprises lateral wall 421C, end 422C, and end 426C. End 422C is generally rounded, or partially circular or partially ellipsoidal, and comprises fulcrum 424C. End 426C is generally rounded, or partially circular or partially ellipsoidal, and comprises fulcrum 428C. It should be appreciated that ends 422C and 426C may comprise any suitable geometry for pivoting against adjacent pump segments or objects, for example, triangular. Lateral wall 421C is arranged between ends 422C and 426C.

Pump segment 420C further comprises piston 430C arranged therein. Piston 430C is connected to end 422C via spring 432C. Piston 430C forms chamber 423C along with lateral wall 421C and end 426C. Chamber 423C is sealed and fluid may not enter or exit chamber 423C except through valves 450C and 452C, as will be discussed in greater detail below. Pump segment 420C further comprises cord 440C, cord 470C, and pulley 446C. Cord 440C comprises end 442C, which is connected to piston 430C, and end 444C, which is connected to the end of an adjacent pump segment, float, or fixed object (not shown). Cord 470C comprises end 474C, which is connected to piston 430C, and end 474C, which is connected to the end of an adjacent pump segment, float, or fixed object (not shown). Pulley 446C is rotatably connected to end 426C and engages cord 440C and cord 470C. In some embodiments, pulley 446C is non-rotatably connected to end 426C. As shown, cord 440C wraps at least partially around pulley 446C, and cord 470C wraps at least partially around pulley 446C. Pulley 446C allows pump segment 420C to pivot about fulcrum 428C relative to the fulcrum of the adjacent pump segment, float, or fixed object (not shown). In some embodiments, pump segment 420C is pivotably connected to the adjacent pump segment, float, or fixed object at fulcrum 428C.

Pump segment 420C further comprises valves 450C and 452C. Valve 450C is an inlet valve and is arranged to allow water 402 to enter chamber 423C when wave energy capture device 410 is in the relaxed state or returning to the relaxed state from the flexed state. Valve 452C is an outlet valve and is arranged to allow water from inside chamber 423C to enter hose 460. In some embodiments, valves 450C and 452C are one-way valves. As pump segment 420C pivots with respect to the adjacent pump segment, float, or fixed object (i.e., as in the flexed state of FIG. 4B), depending on the rotational direction of the pivot, either cord 440C or 470C will taughten about pulley 446C, thereby pulling piston 430C toward end 426C. As piston 430C displaces toward end 426C, water in chamber 423C is forced out of valve 452C and into hose 460. As shown in FIG. 4B, cord 440C is tautened thus pulling piston 430C toward end 426C. As pump segment 420C returns to a non-pivoted position (i.e., aligned as in the relaxed state of FIG. 4A), the tension of the taughtened cords, either cord 440C or cord 470C, releases and spring 432C displaces piston 430C back toward end 422C. As piston 430C is displaced toward end 422C, water 402 is sucked into chamber 423C through valve 450C via the negative pressure created therein. As such, pump 420C is arranged to, using the wave energy of water 402, continuously pump water into hose 460.

Hose 460 is arranged adjacent to pump segments 420A-C. Hose 460 is an elastomeric hose and is fluidly connected to pump segment 420A at valve 452A, pump segment 420B at valve 452B, and pump segment 420C at valve 452C. As previously discussed, pump segment 420A pumps water into hose 460 via valve 452A, pump segment 420B pumps water into hose 460 via valve 452B, and pump segment 420C pumps water into hose 460 via valve 452C. Hose 460 comprises one or more one-way valves arranged therein. As shown, hose 460 comprises one-way valves 462, 464, and 466. One-way valves 462, 464, and 466 are arranged to displace water in hose 460 in generally one direction therealong (e.g., in direction E as shown in FIG. 4B). In some embodiments, hose 460 is at least partially rigid.

Water in hose 460 is expressed in direction E into, for example, conduit 56 as shown in FIG. 1. Water travels through conduit 56 in a singular direction, due to one-way valves 58 and 60 arranged therein, and fills cistern 70. It should be appreciated that, although FIG. 1 shows only two one-way valves arranged in conduit 56, conduit 56 may comprise any number of one-way valves suitable to displace water from hose 460 to cistern 70, for example, one or more one-way valves. As shown, collected water 72 is held in cistern 70 until it is released through valve 74. Once released, water 72 travels through conduit 76 through turbine 78, thereby creating rotational movement of shaft 80. Turbine 78 is generally a machine for producing continuous power in which a wheel or rotor, typically fitted with vanes, is made to revolve by a moving flow of water or fluid, as is known in the art. Turbine 78 can, on its own, generate electrical power. In some embodiments, turbine 78 rotates shaft 80 which in turn activates flywheel 100 to produce and/or store energy (e.g., electrical power), as will be discussed in greater detail below. It should be appreciated that as wave energy capture device 410 pumps water from pump segments 420A-C to cistern 70, the kinetic energy of waves is converted to potential energy. Subsequently, as water 72 is released through valve 74, potential energy is converted to kinetic energy.

FIG. 5A is an elevational view of wave energy capture device 510 in a first position. FIG. 5B is an elevational view of wave energy capture device 510 in a second position. FIG. 5C is an elevational view of wave energy capture device 510 in a third position. Wave energy capture device 510 generally comprises wave fan 520, shaft 530, and roller 540. Wave energy capture device 510 is arranged to capture wave energy on the ocean (or other body of water) floor.

Wave fan 520 is arranged to catch wave energy. Shaft 530 comprises end 532, which is connected to wave fan 520, and end 534, which is connected to roller 540. Shaft 530 is connected to a rotary pivot point at pivot 536. Pivot 536 may include a bearing. Shaft 530 is arranged to rotate about pivot 536 to displace water from hose 550. Roller 540 is rotatably connected to end 534.

Hose 550 is arranged along the ocean floor generally below wave energy capture device 510. Hose 550 is an elastomeric hose comprising intake valve 556. Hose 550 comprises one or more one-way valves arranged therein. As shown, hose 550 comprises one-way valves 552 and 554. One-way valves 552 and 554 are arranged to displace water in hose 550 in direction H. In some embodiments, hose 550 is at least partially rigid.

As shown in FIG. 5A, wave energy capture device 510 is positioned in a first position, or the primed position. A wave or current catches wave fan 520 and displaces wave fan 520, shaft 530, and roller 540 in circumferential direction F. In FIG. 5B, wave energy capture device 510 is in the second position or engaged position. As shown, roller 540 is engaged with hose 550. As shaft 530 is rotated in circumferential direction F, roller 540 compresses hose 550 expressing the water therein in direction H. The water in hose 550 is expressed in direction H through one-way valve 554. As shown in FIG. 5C, wave energy capture device 510 is in third position or the fired position. After roller 540 has expressed water from hose 550 through one-way valve 554 in direction H, the negative pressure created in elastomeric hose 550 causes water to be sucked in through intake valve 556 and one-way valve 552, thereby re-priming hose 550.

Water in hose 550 is expressed in direction H into, for example, conduit 56 as shown in FIG. 1. Water travels through conduit 56 in a singular direction, due to one-way valves 58 and 60 arranged therein, and fills cistern 70. It should be appreciated that, although FIG. 1 shows only two one-way valves arranged in conduit 56, conduit 56 may comprise any number of one-way valves suitable to displace water from hose 550 to cistern 70, for example, one or more one-way valves. As shown, collected water 72 is held in cistern 70 until it is released through valve 74. Once released, water 72 travels through conduit 76 through turbine 78, thereby creating rotational movement of shaft 80. Turbine 78 is generally a machine for producing continuous power in which a wheel or rotor, typically fitted with vanes, is made to revolve by a moving flow of water or fluid, as is known in the art. Turbine 78 can, on its own, generate electrical power. In some embodiments, turbine 78 rotates shaft 80 which in turn activates flywheel 100 to produce and/or store energy (e.g., electrical power), as will be discussed in greater detail below. It should be appreciated that as wave energy capture device 510 pumps water from hose 550 to cistern 70, the kinetic energy of waves is converted to potential energy. Subsequently, as water 72 is released through valve 74, potential energy is converted to kinetic energy. In some embodiments, one or more wave energy capture devices 510 may be arranged along one hose to pump water into cistern 70. In some embodiments, a plurality of wave energy devices arranged along a plurality of hoses are used to pump water into cistern 70.

Figure 6A:
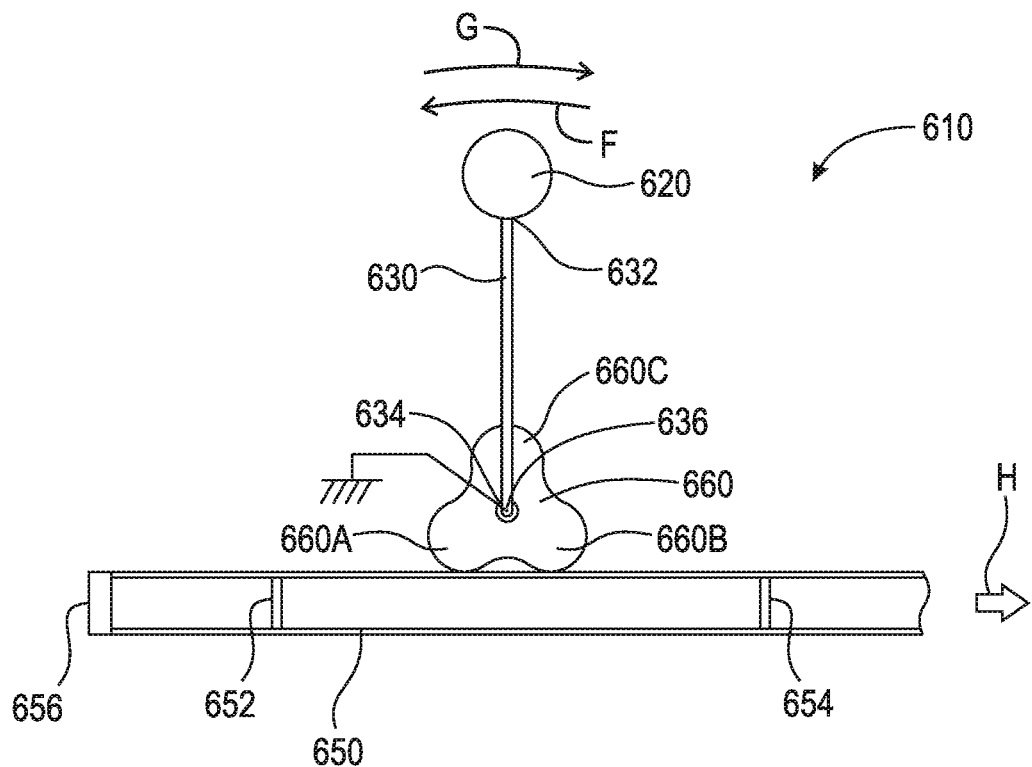
FIG. 6A is an elevational view of a wave energy capture device.
Figure 6B:
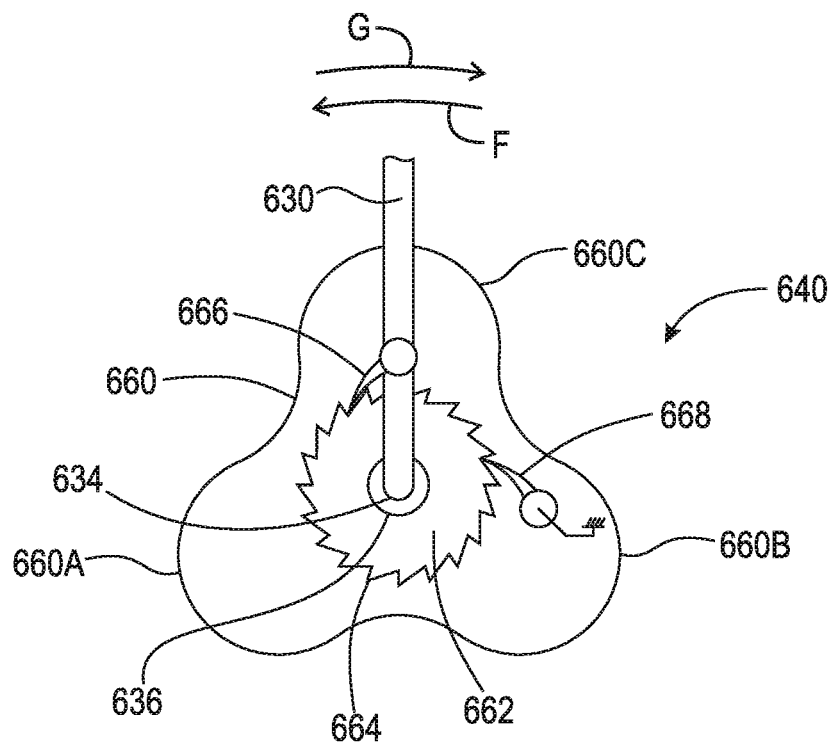
FIG. 6B is a partial cross-sectional view of the wave energy capture device shown in FIG. 6A.

FIG. 6A is an elevational view of wave energy capture device 610. FIG. 6B is a partial cross-sectional view of wave energy capture device 610. Wave energy capture device 610 generally comprises wave fan 620, shaft 630, and peristaltic rotor 660. Wave energy capture device 610 is arranged to capture wave energy on the ocean (or other body of water) floor.

Wave fan 620 is arranged to catch wave energy. Shaft 630 comprises end 632, which is connected to wave fan 620, and end 634, which is connected to peristaltic rotor 660. Shaft 630 is rotatably connected to pivot 636 at end 634. Similarly, peristaltic rotor 660 is rotatably connected to pivot 636. Both shaft 630 and peristaltic rotor 660 rotate about pivot 636. Pivot 636 may include a bearing. Shaft 630 is arranged to rotate about pivot 636 and rotate peristaltic rotor 660 in, for example, circumferential direction F. As peristaltic rotor 660 rotates, protrusions 660A-C engage hose 650 and displace water from hose 550.

As shown in FIG. 6B, wave energy capture device 610 comprises ratchet mechanism 640. Ratchet mechanism 640 comprises ratchet 662, catch 666, and pawl 668. Peristaltic rotor 660 is non-rotatably connected to ratchet 662, which rotates about pivot 636. Ratchet 662 is rotatably connected to pivot 636. Ratchet 662 comprises a plurality of teeth 664 arranged thereon. Catch 666 is rotatably connected to shaft 630 proximate end 634. Catch 666 is arranged to engage teeth 664 such that shaft 630 can rotate ratchet in circumferential direction F, but not in circumferential direction G. However, shaft 630 is capable of displacing in circumferential direction G relative to ratchet 662. Pawl 668 is arranged to engage teeth 664 such that ratchet can rotate only in circumferential direction F.

Hose 650 is arranged along the ocean floor generally below wave energy capture device 610. Hose 650 is an elastomeric hose comprising intake valve 656. Hose 650 comprises one or more one-way valves arranged therein. As shown, hose 650 comprises one-way valves 652 and 654. One-way valves 652 and 654 are arranged to displace water in hose 650 in direction H. In some embodiments, hose 650 is at least partially rigid.

As a wave or current catches wave fan 620 and displaces wave fan 620 and shaft 630 in circumferential direction F, shaft 630, specifically catch 666, engages ratchet 662 and rotates ratchet 662 and thus peristaltic rotor 660 in circumferential direction F. As such, protrusions 660A-C rotate about pivot 636 to engage hose 650 and express the water therein in direction H. The water in hose 650 is expressed in direction H through one-way valve 654. After peristaltic rotor 660 has expressed water from hose 650 through one-way valve 654 in direction H, the negative pressure created in elastomeric hose 650 causes water to be sucked in through intake valve 656 and one-way valve 652, thereby re-priming hose 650. After the wave or current has passed, wave fan 620 and shaft 630 return to an upright position. In some embodiments, in order to return to its starting upright position, shaft 630 may be connected to a spring that returns wave energy capture device 610 to its original starting position. In some embodiments, in order to return to its starting upright position, wave fan 620 may comprise a float that pulls it and shaft 630 upright after displacement.

Water in hose 650 is expressed in direction H into, for example, conduit 56 as shown in FIG. 1. Water travels through conduit 56 in a singular direction, due to one-way valves 58 and 60 arranged therein, and fills cistern 70. It should be appreciated that, although FIG. 1 shows only two one-way valves arranged in conduit 56, conduit 56 may comprise any number of one-way valves suitable to displace water from hose 650 to cistern 70, for example, one or more one-way valves. As shown, collected water 72 is held in cistern 70 until it is released through valve 74. Once released, water 72 travels through conduit 76 through turbine 78, thereby creating rotational movement of shaft 80. Turbine 78 is generally a machine for producing continuous power in which a wheel or rotor, typically fitted with vanes, is made to revolve by a moving flow of water or fluid, as is known in the art. Turbine 78 can, on its own, generate electrical power. In some embodiments, turbine 78 rotates shaft 80 which in turn activates flywheel 100 to produce and/or store energy (e.g., electrical power), as will be discussed in greater detail below. It should be appreciated that as wave energy capture device 610 pumps water from hose 650 to cistern 70, the kinetic energy of waves is converted to potential energy. Subsequently, as water 72 is released through valve 74, potential energy is converted to kinetic energy. In some embodiments, one or more wave energy capture devices 610 may be arranged along one hose to pump water into cistern 70. In some embodiments, a plurality of wave energy devices arranged along a plurality of hoses are used to pump water into cistern 70.

Figure 7:
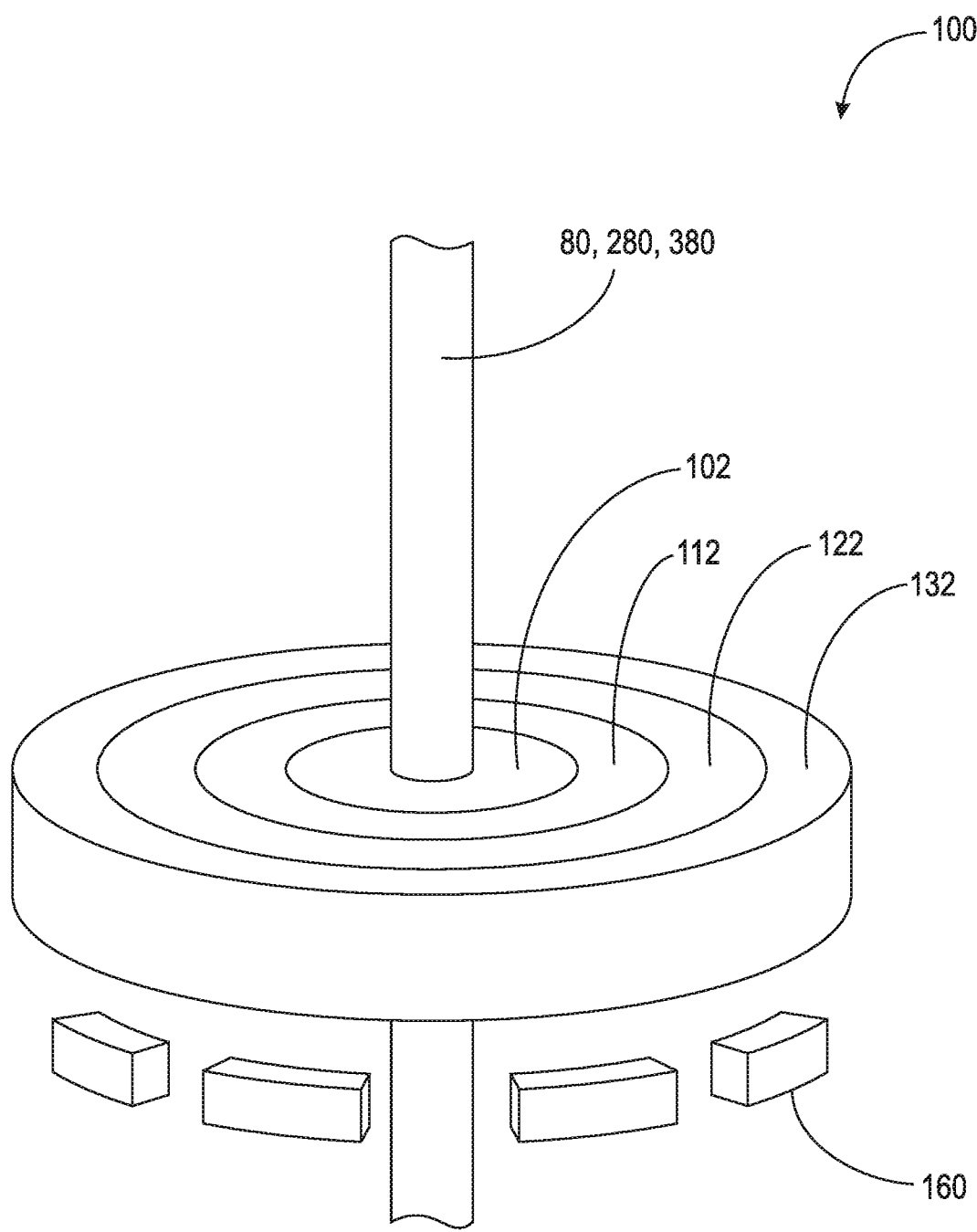
FIG. 7 is a perspective view of a flywheel.
Figure 8:
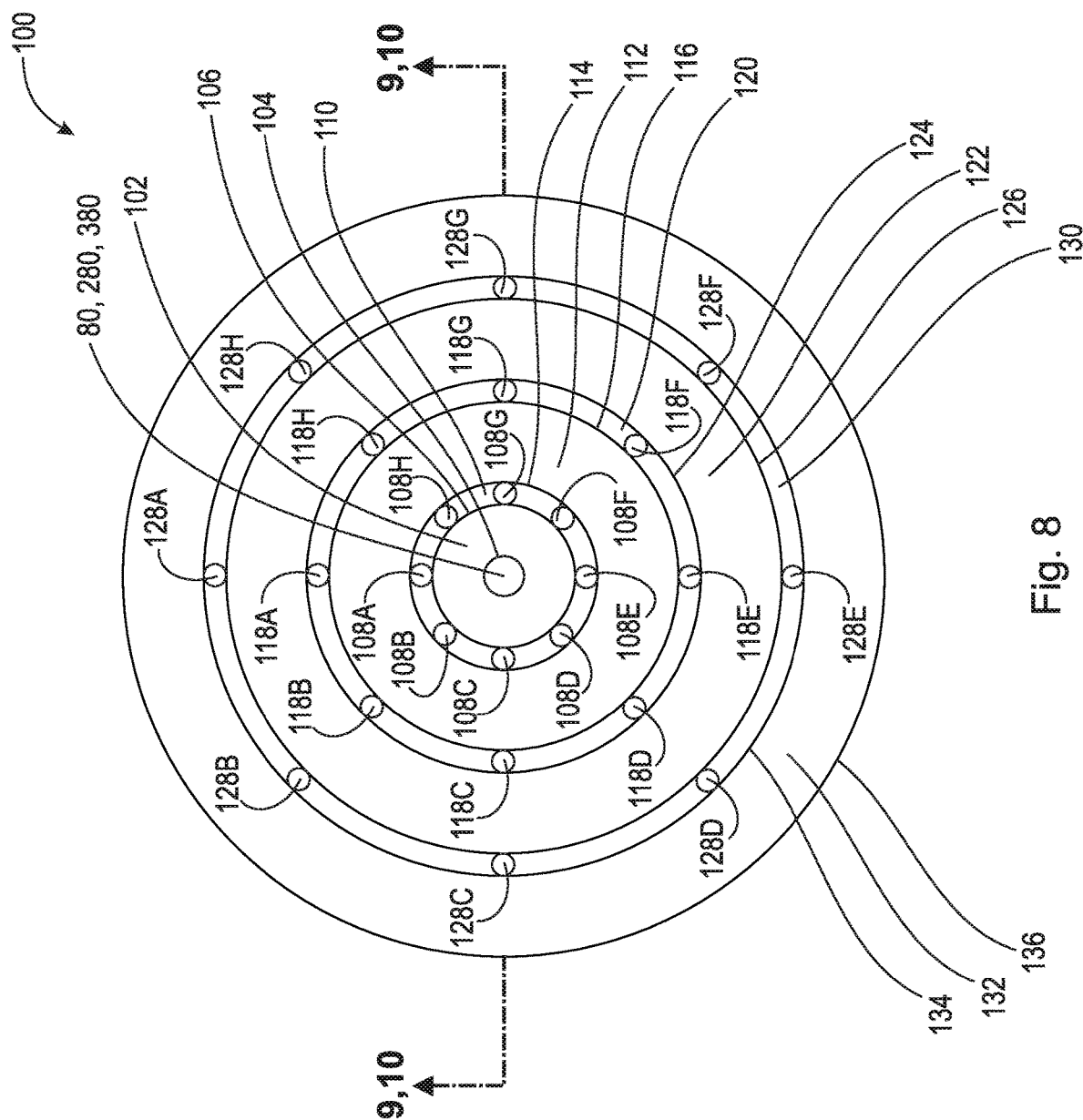
FIG. 8 is an elevational view of a flywheel.

FIG. 7 is a perspective view of flywheel 100. FIG. 8 is an elevational view of flywheel 100. Flywheel 100 is a concentric ring flywheel that is connected to shaft 80, 280, 380. Flywheel 100 generally comprises rings 102, 112, 122, and 132, all concentrically arranged about shaft 80, 280, 380. It should be appreciated that flywheel 100 may have any suitable number of rings, and that this disclosure should not be limited to the use of just four rings as shown. Rings 102, 112, 122, and 132 may be arranged on magnetic bearings 160. In some embodiments, rings 102, 112, 122, and 132 have planar top surfaces and planar bottom surfaces, the planar top surfaces being parallel to the planar bottom surfaces. In some embodiments, rings 102, 112, 122, and 132 have planar top surfaces and planar bottom surfaces, the planar bottom surfaces being non-parallel to the planar top surfaces (e.g., angled). In some embodiments, rings 102, 112, 122, and 132 have planar top surfaces and curvilinear bottom surfaces, as will be discussed in greater detail below. Additionally, rings 102, 112, 122, and 132 may be solid, hollow, or partially hollow.

Ring 102 comprises radially inward facing surface 104 and radially outward facing surface 106. Radially inward facing surface 104 is non-rotatably connected to shaft 80, 280. In some embodiments, and as described with respect to FIG. 3, radially inward facing surface 104 is threadably engaged with shaft 380. For example, radially inward facing surface 104 comprises threading which engages threading 382 of shaft 380.

Ring 112 comprises radially inward facing surface 114 and radially outward facing surface 116. Ring 112 is arranged radially outward from ring 102 with space 110 arranged radially therebetween. Ring 112 is arranged to non-rotatably engage ring 102 such that rings 102 and 112 can be rotatably locked and unlocked. Specifically, radially inward facing surface 114 is arranged to engage radially outward facing surface 106, for example, via one or more rollers, detents, connectors, ramps, etc. In some embodiments, clutch connectors 108A-H are arranged between radially inward facing surface 114 and radially outward facing surface 106. Clutch connectors 108A-H, when activated, non-rotatably connect ring 112 with ring 102. It should be appreciated that any suitable means for non-rotatably connecting ring 112 with ring 102 may be used. In some embodiments, clutch connectors 108A-H are rollers and radially inward facing surface 114 comprises a plurality of ramps such that, when ring 102 reaches a preset rotational speed the rollers run up the ramps and non-rotatably connect ring 112 with ring 102. In such a purely mechanical clutch connection method, once the rotational speed of ring 102 drops below the preset rotational speed, the rollers disengage and ring 112 disengages ring 102 and continues to rotate unencumbered by the lapse in energy input. In some embodiments, clutch connectors 108A-H are connected to radially outward facing surface 106 and can be displaced radially outward to lock in with contact points arranged on radially inward facing surface 114 to non-rotatably connect ring 112 with ring 102. This radial displacement may occur automatically once ring 102 reaches a certain rotational speed via either a mechanical mechanism or an electronic actuation mechanism guided by a computer and wireless communication (e.g., Bluetooth® communication, infrared radiation, radio waves, etc.). In such an electronic version of clutch engagement between rings 112 and 102, a computer may calculate the optimal rotational speed (e.g., RPM) to transfer energy between rings based on rotational speed of ring 102 (and shaft 80, 280) and the radius and mass of rings 102 and 112. The computer may then activate the electronic clutch mechanism between rings 102 and 112. Using a computer system, both the mass and radius of flywheel 100 can be controlled and varied almost instantaneously in order to maintain a constant rate of rotational speed to ensure that the wave energy captured can be converted to a consistent, stable, and accessible energy source. For example, flywheel 100 could be maintained at an optimal rotational speed of 1,800 RPM by transferring energy from an outer ring inward or from an inner ring outward.

Ring 122 comprises radially inward facing surface 124 and radially outward facing surface 126. Ring 122 is arranged radially outward from ring 112 with space 120 arranged radially therebetween. Ring 122 is arranged to non-rotatably engage ring 112 such that rings 112 and 122 can be rotatably locked and unlocked. Specifically, radially inward facing surface 124 is arranged to engage radially outward facing surface 116, for example, via one or more rollers, detents, connectors, ramps, etc. In some embodiments, clutch connectors 118A-H are arranged between radially inward facing surface 124 and radially outward facing surface 116. Clutch connectors 118A-H, when activated, non-rotatably connect ring 122 with ring 112. It should be appreciated that any suitable means for non-rotatably connecting ring 122 with ring 112 may be used. In some embodiments, clutch connectors 118A-H are rollers and radially inward facing surface 124 comprises a plurality of ramps such that, when ring 112 reaches a preset rotational speed the rollers run up the ramps and non-rotatably connect ring 122 with ring 112. In such a purely mechanical clutch connection method, once the rotational speed of ring 112 drops below the preset rotational speed, the rollers disengage and ring 122 disengages ring 112 and continues to rotate unencumbered by the lapse in energy input. In some embodiments, clutch connectors 118A-H are connected to radially outward facing surface 116 and can be displaced radially outward to lock in with contact points arranged on radially inward facing surface 124 to non-rotatably connect ring 122 with ring 112. This radial displacement may occur automatically once ring 112 reaches a certain rotational speed via either a mechanical mechanism or an electronic actuation mechanism guided by a computer and wireless communication (e.g., Bluetooth® communication, infrared radiation, radio waves, etc.). In such an electronic version of clutch engagement between rings 122 and 112, a computer may calculate the optimal rotational speed (e.g., RPM) to transfer energy between rings based on rotational speed of ring 112 (and ring 102 and shaft 80, 280) and the radius and mass of rings 112 and 122. The computer may then activate the electronic clutch mechanism between rings 112 and 122. Using a computer system, both the mass and radius of flywheel 100 can be controlled and varied almost instantaneously in order to maintain a constant rate of rotational speed to ensure that the wave energy captured can be converted to a consistent, stable, and accessible energy source. For example, flywheel 100 could be maintained at an optimal rotational speed of 1,800 RPM by transferring energy from an outer ring inward or from an inner ring outward.

Ring 132 comprises radially inward facing surface 134 and radially outward facing surface 136. Ring 132 is arranged radially outward from ring 122 with space 130 arranged radially therebetween. Ring 132 is arranged to non-rotatably engage ring 122 such that rings 122 and 132 can be rotatably locked and unlocked. Specifically, radially inward facing surface 134 is arranged to engage radially outward facing surface 126, for example, via one or more rollers, detents, connectors, ramps, etc. In some embodiments, clutch connectors 128A-H are arranged between radially inward facing surface 134 and radially outward facing surface 126. Clutch connectors 128A-H, when activated, non-rotatably connect ring 132 with ring 122. It should be appreciated that any suitable means for non-rotatably connecting ring 132 with ring 122 may be used. In some embodiments, clutch connectors 128A-H are rollers and radially inward facing surface 134 comprises a plurality of ramps such that, when ring 122 reaches a preset rotational speed the rollers run up the ramps and non-rotatably connect ring 132 with ring 122. In such a purely mechanical clutch connection method, once the rotational speed of ring 122 drops below the preset rotational speed, the rollers disengage and ring 132 disengages ring 122 and continues to rotate unencumbered by the lapse in energy input. In some embodiments, clutch connectors 128A-H are connected to radially outward facing surface 126 and can be displaced radially outward to lock in with contact points arranged on radially inward facing surface 134 to non-rotatably connect ring 132 with ring 122. This radial displacement may occur automatically once ring 122 reaches a certain rotational speed via either a mechanical mechanism or an electronic actuation mechanism guided by a computer and wireless communication (e.g., Bluetooth® communication, infrared radiation, radio waves, etc.). In such an electronic version of clutch engagement between rings 132 and 122, a computer may calculate the optimal rotational speed (e.g., RPM) to transfer energy between rings based on rotational speed of ring 122 (and ring 102, ring 112, and shaft 80, 280) and the radius and mass of rings 122 and 132. The computer may then activate the electronic clutch mechanism between rings 122 and 132. Using a computer system, both the mass and radius of flywheel 100 can be controlled and varied almost instantaneously in order to maintain a constant rate of rotational speed to ensure that the wave energy captured can be converted to a consistent, stable, and accessible energy source. For example, flywheel 100 could be maintained at an optimal rotational speed of 1,800 RPM by transferring energy from an outer ring inward or from an inner ring outward.

In some embodiments, flywheel 100 is arranged on magnetic bearings and arranged in a vacuum to increase efficiency. In some embodiments, shaft 80, 280 is connected to ring 102, specifically radially inward facing surface 104, via clutch connectors (e.g., a free wheel clutch). In times of low wave energy input, shaft 80, 280 may disconnect from flywheel 100 to limit frictional energy loss. In times of high wave energy input, energy can be progressively transferred to the larger, heavier outer rings having greater angular momentum and hence greater energy generation/storage. By arranging rotors adjacent to rings 102, 112, 122, and 132 (e.g., below the bottom surfaces of the rings), flywheel 100 can provide for energy storage as well as conversion of kinetic energy into electrical energy. As previously discussed, flywheel 100 stores kinetic energy (energy of mass in motion) by constantly spinning a compact rotor in a low-friction environment. The stored kinetic energy of flywheel 100 is proportional to the mass of its rotor, the square of its radius, and the square of its rotational speed (e.g., RPM). Flywheel 100 is capable of being adjusted by altering factors such as, increasing the rotational speed of the rotor (i.e., by engaging outer rings), which increases stored energy, and increasing the mass of the rotor (i.e., by engaging outer rings), which increases stored energy. Flywheel 100, which acts as a rotor or armature, creates electromagnetic induction by spinning or rotating inside or adjacent to a stator of opposing magnetism. The stator is generally a stationary magnetic field with large copper windings. As is known in the art, is the rotation of the electromagnetic armature/rotor (i.e., flywheel) relative to the stationary magnetic field (i.e., the stator) which produces electrical current. The present disclosure harnesses wave energy to rotate flywheel 100, the rotational velocity of which can be adjusted by engaging/disengaging the concentric rings, and generate electrical current. It should be appreciated that flywheel 100 can be used with wind energy capture devices in addition to wave energy capture devices.

Figure 9A:
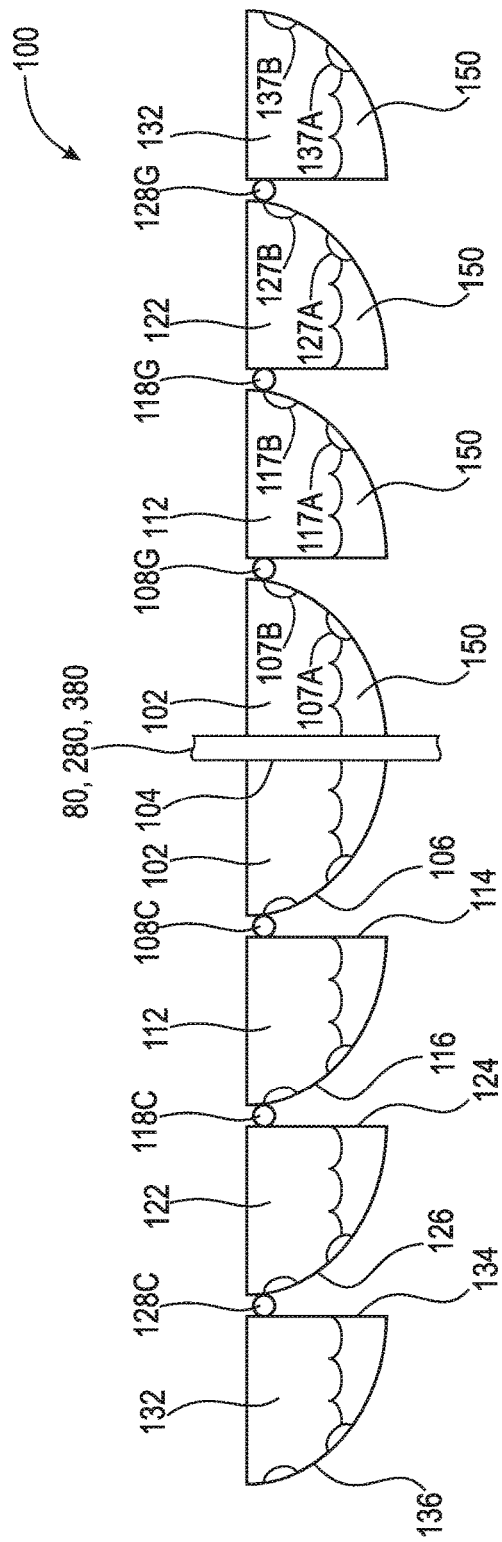
FIG. 9A is a cross-sectional view of the flywheel taken generally along line 9-9 in FIG. 8, in a first state.

FIG. 9A is a cross-sectional view of an embodiment of flywheel 100 taken generally along line 9-9 in FIG. 8, in a first state. In the embodiment shown, rings 102, 112, 122, and 132 comprise curvilinear bottom surfaces. Each of rings 102, 112, 122, and 132 are hollow and comprise one or more ridges therein. Additionally, rings 102, 112, 122, and 132 may further include fluid 150 therein. In the first state, flywheel 100 is not rotating, but rather is at rest.

As shown, ring 102 comprises ridges 107A and 107B arranged on radially outward facing surface 106. Radially outward facing surface 106 may be completely parabolic from radially inward facing surface 104, completely linear from radially inward facing surface 104, or comprise a parabolic section connected to radially inward facing surface 104 connected to a linear portion leading to the top surface. Ring 102 comprises fluid 150, which may be, for example, water, mercury, or any other suitable fluid for controlling and/or increasing angular velocity with ring 102. In the first state, as shown in FIG. 9A, fluid 150 is drawn down and radially inward toward radially inward facing surface 104, due to gravity.

Ring 112 comprises ridges 117A and 117B arranged on radially outward facing surface 116. Radially outward facing surface 116 may be completely parabolic from radially inward facing surface 114, completely linear from radially inward facing surface 114, or comprise a parabolic section connected to radially inward facing surface 114 connected to a linear portion leading to the top surface. Ring 112 comprises fluid 150, which may be, for example, water, mercury, or any other suitable fluid for controlling and/or increasing angular velocity with ring 112. In the first state, as shown in FIG. 9A, fluid 150 is drawn down and radially inward toward radially inward facing surface 114, due to gravity.

Ring 122 comprises ridges 127A and 127B arranged on radially outward facing surface 126. Radially outward facing surface 126 may be completely parabolic from radially inward facing surface 124, completely linear from radially inward facing surface 124, or comprise a parabolic section connected to radially inward facing surface 124 connected to a linear portion leading to the top surface. Ring 122 comprises fluid 150, which may be, for example, water, mercury, or any other suitable fluid for controlling and/or increasing angular velocity with ring 122. In the first state, as shown in FIG. 9A, fluid 150 is drawn down and radially inward toward radially inward facing surface 124, due to gravity.

Ring 132 comprises ridges 137A and 137B arranged on radially outward facing surface 136. Radially outward facing surface 136 may be completely parabolic from radially inward facing surface 134, completely linear from radially inward facing surface 134, or comprise a parabolic section connected to radially inward facing surface 134 connected to a linear portion leading to the top surface. Ring 132 comprises fluid 150, which may be, for example, water, mercury, or any other suitable fluid for controlling and/or increasing angular velocity with ring 132. In the first state, as shown in FIG. 9A, fluid 150 is drawn down and radially inward toward radially inward facing surface 134, due to gravity.

Figure 9B:
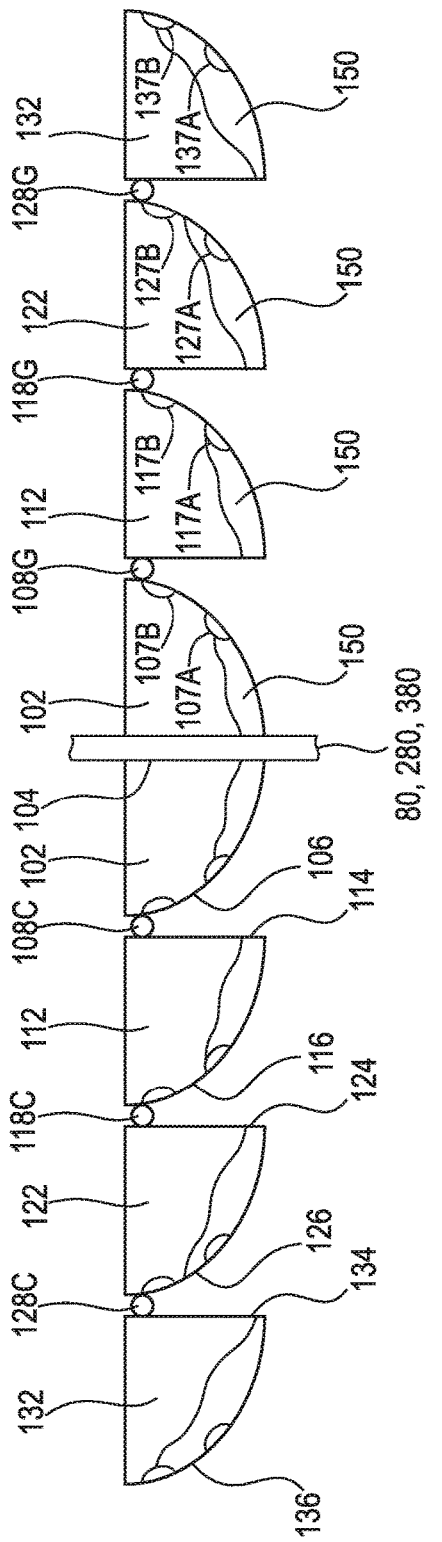
FIG. 9B is a cross-sectional view of the flywheel taken generally along line 9-9 in FIG. 8, in a second state.

FIG. 9B is a cross-sectional view of flywheel 100 taken generally along line 9-9 in FIG. 8, with rings 102, 112, 122, and 132 having curvilinear bottom surfaces, in a second state. In the second state, flywheel 100 is rotating, with all of clutch connectors 108A-H, 118A-H, and 128A-H engaged to rotatably lock rings 102, 112, 122, and 132, at a less than maximum rotational speed. As shown, fluid 150 is displaced up and radially outward along the respective radially outward facing surfaces. In ring 102, fluid 150 is displaced along radially outward facing surface 106 to the level of ridge 107A. In ring 112, fluid 150 is displaced along radially outward facing surface 116 to the bottom of ridge 117B. In ring 122, fluid 150 is displaced along radially outward facing surface 126 to the top of ridge 127B. In ring 132, fluid 150 is displaced along radially outward facing surface 136 up past ridge 137B. Fluid in the outer rings will exhibit a greater displacement along the radially outward facing surface than that of the inner rings because, when rotationally locked, the outer rings rotate at a higher angular velocity than that of the inner rings.

Figure 9C:
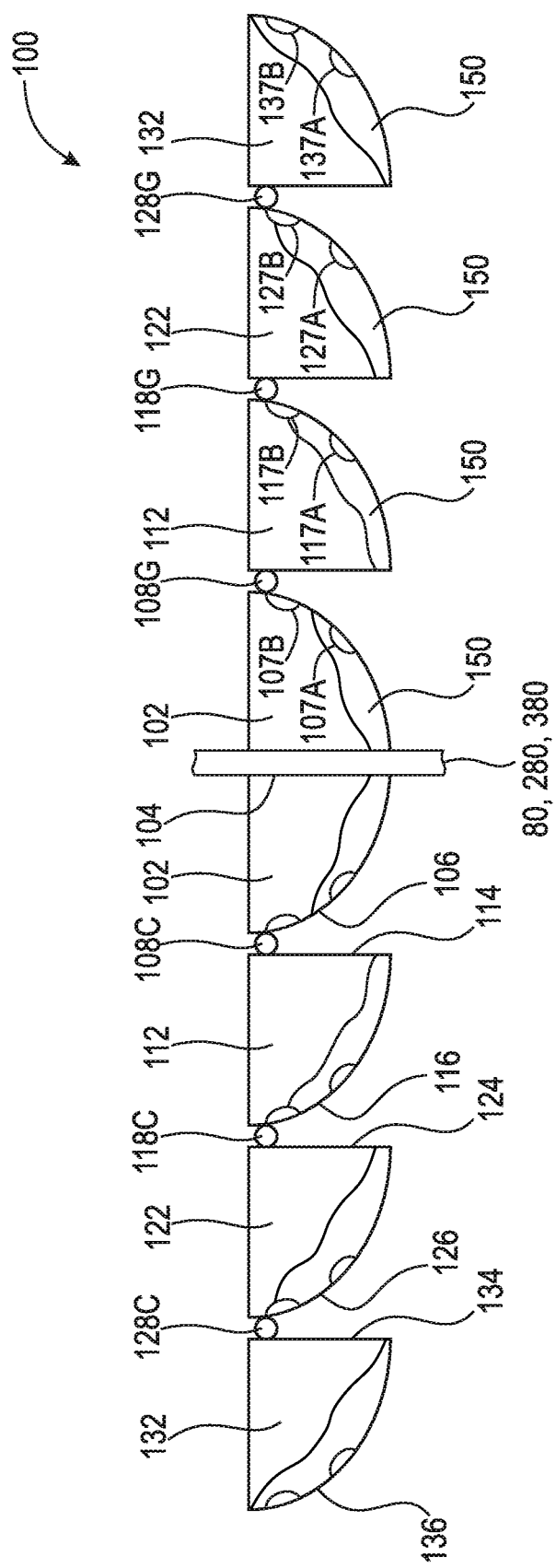
FIG. 9C is a cross-sectional view of the flywheel taken generally along line 9-9 in FIG. 8, in a third state.

FIG. 9C is a cross-sectional view of flywheel 100 taken generally along line 9-9 in FIG. 8, with rings 102, 112, 122, and 132 having curvilinear bottom surfaces, in a third state. In the third state, flywheel 100 is rotating, with all of clutch connectors 108A-H, 118A-H, and 128A-H engaged to rotatably lock rings 102, 112, 122, and 132, at a maximum rotational speed. As shown, fluid 150 is further displaced up and radially outward along the respective radially outward facing surfaces. In ring 102, fluid 150 is displaced along radially outward facing surface 106 to the bottom of ridge 107B. In ring 112, fluid 150 is displaced along radially outward facing surface 116 to the top of ridge 117B. In ring 122, fluid 150 is displaced along radially outward facing surface 126 up past ridge 127B. In ring 132, fluid 150 is displaced along radially outward facing surface 136 up to the top surface of ring 132.

FIG. 10A is a cross-sectional view of an embodiment of flywheel 100 taken generally along line 10-10 in FIG. 8, in a first state. In the embodiment shown, rings 102, 112, 122, and 132 comprise curvilinear bottom surfaces. Each of rings 102, 112, 122, and 132 are hollow and comprise one or more walls or gates therein. Additionally, rings 102, 112, 122, and 132 may further include fluid 150 therein. In the first state, flywheel 100 is not rotating, but rather is at rest.

As shown, ring 102 comprises walls 109A and 109B extending between the top surface and radially outward facing surface 106. Radially outward facing surface 106 may be completely parabolic from radially inward facing surface 104, completely linear from radially inward facing surface 104, or comprise a parabolic section connected to radially inward facing surface 104 connected to a linear portion leading to the top surface. Ring 102 comprises fluid 150, which may be, for example, water, mercury, or any other suitable fluid for controlling and/or increasing angular velocity with ring 102. In the first state, as shown in FIG. 9A, fluid 150 is drawn down and radially inward toward radially inward facing surface 104, due to gravity. Neither of walls 109A or 109B is open to allow fluid 150 to displace radially outward within ring 102.

Ring 112 comprises walls 119A and 119B extending between the top surface and radially outward facing surface 116. Radially outward facing surface 116 may be completely parabolic from radially inward facing surface 114, completely linear from radially inward facing surface 114, or comprise a parabolic section connected to radially inward facing surface 114 connected to a linear portion leading to the top surface. Ring 112 comprises fluid 150, which may be, for example, water, mercury, or any other suitable fluid for controlling and/or increasing angular velocity with ring 112. In the first state, as shown in FIG. 9A, fluid 150 is drawn down and radially inward toward radially inward facing surface 114, due to gravity. Neither of walls 119A or 119B is open to allow fluid 150 to displace radially outward within ring 112.

Ring 122 comprises walls 129A and 129B extending between the top surface and radially outward facing surface 126. Radially outward facing surface 126 may be completely parabolic from radially inward facing surface 124, completely linear from radially inward facing surface 124, or comprise a parabolic section connected to radially inward facing surface 124 connected to a linear portion leading to the top surface. Ring 122 comprises fluid 150, which may be, for example, water, mercury, or any other suitable fluid for controlling and/or increasing angular velocity with ring 122. In the first state, as shown in FIG. 9A, fluid 150 is drawn down and radially inward toward radially inward facing surface 124, due to gravity. Neither of walls 129A or 129B is open to allow fluid 150 to displace radially outward within ring 122.

Ring 132 comprises walls 139A and 139B extending between the top surface and radially outward facing surface 136. Radially outward facing surface 136 may be completely parabolic from radially inward facing surface 134, completely linear from radially inward facing surface 134, or comprise a parabolic section connected to radially inward facing surface 134 connected to a linear portion leading to the top surface. Ring 132 comprises fluid 150, which may be, for example, water, mercury, or any other suitable fluid for controlling and/or increasing angular velocity with ring 132. In the first state, as shown in FIG. 9A, fluid 150 is drawn down and radially inward toward radially inward facing surface 134, due to gravity. Neither of walls 139A or 139B is open to allow fluid 150 to displace radially outward within ring 132.

FIG. 10B is a cross-sectional view of flywheel 100 taken generally along line 10-10 in FIG. 8, with rings 102, 112, 122, and 132 having curvilinear bottom surfaces, in a second state. In the second state, flywheel 100 is rotating, with all of clutch connectors 108A-H, 118A-H, and 128A-H engaged to rotatably lock rings 102, 112, 122, and 132, at a less than maximum rotational speed. As shown, fluid 150 is displaced up and radially outward along the respective radially outward facing surfaces. In ring 102, wall 109A is open allowing fluid 150 to displace along radially outward facing surface 106. Wall 109A may open via the opening of a valve or window, either electronically or mechanically. In ring 112, wall 119A is open allowing fluid 150 to displace along radially outward facing surface 116. Wall 109A may open via the opening of a valve or window, either electronically or mechanically. In ring 122, wall 129A is open allowing fluid 150 to displace along radially outward facing surface 126. Wall 129A may open via the opening of a valve or window, either electronically or mechanically. In ring 132, wall 139A is open allowing fluid 150 to displace along radially outward facing surface 136. Wall 139A may open via the opening of a valve or window, either electronically or mechanically. Fluid in the outer rings will exhibit a greater displacement along the radially outward facing surface than that of the inner rings because, when rotationally locked, the outer rings rotate at a higher angular velocity than that of the inner rings.

FIG. 10C is a cross-sectional view of flywheel 100 taken generally along line 10-10 in FIG. 8, with rings 102, 112, 122, and 132 having curvilinear bottom surfaces, in a third state. In the third state, flywheel 100 is rotating, with all of clutch connectors 108A-H, 118A-H, and 128A-H engaged to rotatably lock rings 102, 112, 122, and 132, at a maximum rotational speed. As shown, fluid 150 is further displaced up and radially outward along the respective radially outward facing surfaces. In ring 102, both of walls 109A and 109B are open allowing fluid 150 to displace along radially outward facing surface 106. Like wall 109A, wall 109B may open via the opening of a valve or window, either electronically or mechanically. In ring 112, both of walls 119A and 119B are open allowing fluid 150 to displace along radially outward facing surface 116. Like wall 119A, wall 119B may open via the opening of a valve or window, either electronically or mechanically. In ring 122, both of walls 129A and 129B are open allowing fluid 150 to displace along radially outward facing surface 126. Like wall 129A, wall 129B may open via the opening of a valve or window, either electronically or mechanically. In ring 132, both of walls 139A and 139B are open allowing fluid 150 to displace along radially outward facing surface 136. Like wall 139A, wall 139B may open via the opening of a valve or window, either electronically or mechanically.

It should be appreciated that valves may be arranged in the walls of the respective rings. These valves may be electronically controlled. Specifically, the valves may be opened when wave energy is large enough to provide a high angular velocity to flywheel 100. The valves may be operated mechanically, such that, when the pressure of fluid 150 against the valves reaches a predetermined threshold, the valves automatically open and allow fluid to flow into the next compartment within the ring. The addition of the walls within the individual rings of flywheel 100 provide even better control of angular velocity and the transfer of mass radially within flywheel 100.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Water
10 Wave energy capture device
20 Chamber
22 Opening
24 Floor
24A End
24B End
26 Wave gate
28 Section
30 Opening
32 Rail
40 Cylinder, object, float
42 Radially outward facing surface
44A Point
44B Point (not shown)
46A Spring
46B Spring (not shown)
50 Hose
50A Portion
52 Intake valve
54 One-way valve
56 Conduit
58 One-way valve
60 One-way valve
62 One-way valve
70 Cistern
72 Water
74 Valve
76 Conduit
78 Turbine
80 Shaft
100 Flywheel
102 Ring
104 Radially inward facing surface
106 Radially outward facing surface
107A Ridge
107B Ridge
108A Clutch connector
108B Clutch connector
108C Clutch connector
108D Clutch connector
108E Clutch connector
108F Clutch connector
108G Clutch connector
108H Clutch connector
109A Wall
109B Wall
110 Space
112 Ring
114 Radially inward facing surface
116 Radially outward facing surface
117A Ridge
117B Ridge
118A Clutch connector
118B Clutch connector
118C Clutch connector
118D Clutch connector
118E Clutch connector
118F Clutch connector
118G Clutch connector
118H Clutch connector
119A Wall
119B Wall
120 Space
122 Ring
124 Radially inward facing surface
126 Radially outward facing surface
127A Ridge
127B Ridge
128A Clutch connector
128B Clutch connector
128C Clutch connector
128D Clutch connector
128E Clutch connector
128F Clutch connector
128G Clutch connector
128H Clutch connector
129A Wall
129B Wall
130 Space
132 Ring
134 Radially inward facing surface
136 Radially outward facing surface
137A Ridge
137B Ridge
139A Wall
139B Wall
150 Fluid
160 Magnetic bearings
202 Water
210 Wave energy capture device
220 Float
230 Shaft
230A Portion
230B Portion
232 End
234 End
240 Fulcrum
242 Oscillation restrictor
250 Wheel
260 Shaft
262 End
264 End
270 Gearbox
280 Shaft
302 Water
310 Wave energy capture device
320 Float
330 Shaft
330A Portion
330B Portion
332 End
334 End
340 Fulcrum
342 Oscillation restrictor
380 Shaft
382 Threading
402 Water
410 Wave energy capture device
420A Pump segment 420B Pump segment
420C Pump segment
421A Lateral wall
421B Lateral wall
421C Lateral wall
422A End
422B End
422C End
423A Chamber
423B Chamber
423C Chamber
424A Fulcrum
424B Fulcrum
424C Fulcrum
426A End
426B End
426C End
428A Fulcrum
428B Fulcrum
428C Fulcrum
430A Piston
430B Piston
430C Piston
432A Spring
432B Spring
432C Spring
440A Cord
440B Cord
440C Cord
442A End
442B End
442C End
444A End
444B End
444C End
446A Pulley
446B Pulley
446C Pulley
450A Valve
450B Valve
450C Valve
452A Valve
452B Valve
452C Valve
460 Hose
462 One-way valve
464 One-way valve
466 One-way valve
470A Cord
470B Cord
470C Cord
472A End
472B End
472C End
474A End
474B End
474C End
510 Wave energy capture device
520 Wave fan
530 Shaft
532 End
534 End
536 Pivot
540 Roller
550 Hose
552 One-way valve
554 One-way valve
556 Intake valve
610 Wave energy capture device
620 Wave fan
630 Shaft
632 End
634 End
636 Pivot
640 Ratchet mechanism
650 Hose
652 One-way valve
654 One-way valve
656 Intake valve
660 Peristaltic rotor
660A Protrusion
660B Protrusion
660C Protrusion
662 Ratchet
664 Teeth
666 Catch
668 Pawl
A Direction
B Direction
C Direction
D Direction
E Direction
F Direction
G Direction
H Direction

What is claimed is:

1. A wave energy capture device, comprising:
a wave chamber arranged to engage a body of water comprising a plurality of waves, including:
a floor having a front end and a rear end;
a first opening arranged proximate the front end;
a second opening arranged proximate the rear end; and,
a hose arranged on said floor and extending from the first opening to the second opening, the hose operatively arranged to fill with water from the body of water; and,
a cylinder arranged on the floor proximate the front end, the cylinder connected to the wave chamber via one or more springs;
wherein, when one of the plurality of waves enters the first opening, the cylinder:
is displaced along the floor from the front end toward the rear end; and,
expresses the water in the hose in a first direction from the front end toward the rear end.

2. The wave energy capture device as recited in claim 1, further comprising a cistern fluidly connected to the hose, wherein the cylinder expresses the water in the hose into the cistern.

3. The wave energy capture device as recited in claim 2, further comprising a turbine fluidly connected to the cistern and non-rotatably connected to an input end of a first shaft.

4. The assembly as recited in claim 3, wherein the water in the cistern flows through the turbine to rotate the first shaft.

5. The assembly as recited in claim 1, wherein the hose comprises one or more one-way valves.

6. The assembly as recited in claim 1, further comprising a wave gate operatively arranged proximate the front end to regulate the magnitude of the plurality of waves.

7. The assembly as recited in claim 1, wherein the floor is sloped at least partially downward in the first direction.

8. The assembly as recited in claim 1, wherein the hose comprises a rigid portion proximate an intake end.

9. The assembly as recited in claim 1, wherein the hose comprises an intake valve connected thereto at an intake end.

10. The assembly as recited in claim 1, wherein the wave chamber further comprises an overhang section to which the cylinder is connected via the one or more springs.

11. The assembly as recited in claim 1, wherein the wave chamber is slidably arranged on a rail.

12. The assembly as recited in claim 1, wherein the hose comprises a peristaltic pump.

13. A wave energy capture device, comprising:
- a wave chamber arranged to engage a body of water comprising a plurality of waves, including:
  - a floor having a front end and a rear end, the floor having a higher elevational value at the front end relative to the rear end;
  - a first opening arranged proximate the front end;
  - a second opening arranged proximate the rear end; and,
  - a hose arranged on said floor and extending from the first opening to the second opening, the hose operatively arranged to continuously fill with water from the body of water; and,
- an object arranged on the floor proximate the front end, the object connected to the wave chamber via one or more springs;
- wherein, when one of the plurality of waves enters the first opening, the object:
  - is displaced from the front end toward the rear end; and,
  - expresses the water in the hose in a first direction from the front end toward the rear end.

14. The wave energy capture device as recited in claim 13, further comprising a cistern fluidly connected to the hose, wherein the cylinder expresses the water in the hose into the cistern.

15. The wave energy capture device as recited in claim 14, further comprising a turbine fluidly connected to the cistern and non-rotatably connected to an input end of a first shaft, wherein the water in the cistern flows through the turbine to rotate the first shaft.

16. The assembly as recited in claim 13, wherein the hose comprises one or more one-way valves.

17. The assembly as recited in claim 13, further comprising a wave gate operatively arranged proximate the front end to regulate the magnitude of the plurality of waves.

18. The assembly as recited in claim 13, wherein the floor is at least partially curvilinear.

19. The assembly as recited in claim 13, wherein the hose comprises a rigid portion proximate the front end.

20. The assembly as recited in claim 13, wherein the chamber further comprises an overhang section to which the cylinder is connected via the one or more springs.

* * * * *